US009354927B2

(12) United States Patent
Hiltgen et al.

(10) Patent No.: US 9,354,927 B2
(45) Date of Patent: May 31, 2016

(54) SECURING VIRTUAL MACHINE DATA

(75) Inventors: Daniel K. Hiltgen, San Jose, CA (US); Rene W. Schmidt, Palo Alto, CA (US)

(73) Assignee: VMware, Inc., Palo Alto, CA (US)

(*) Notice: Subject to any disclaimer, the term of this patent is extended or adjusted under 35 U.S.C. 154(b) by 1439 days.

(21) Appl. No.: 11/960,524

(22) Filed: Dec. 19, 2007

(65) Prior Publication Data

US 2008/0155208 A1 Jun. 26, 2008

Related U.S. Application Data

(60) Provisional application No. 60/871,234, filed on Dec. 21, 2006, provisional application No. 60/884,568, filed on Jan. 11, 2007, provisional application No. 60/886,072, filed on Jan. 22, 2007.

(51) Int. Cl.

| | |
|---|---|
| ***G06F 12/00*** | (2006.01) |
| ***G06F 9/48*** | (2006.01) |
| ***G06F 9/455*** | (2006.01) |
| ***G06F 9/50*** | (2006.01) |
| ***G06F 21/53*** | (2013.01) |

(52) U.S. Cl.

CPC ............ *G06F 9/485* (2013.01); *G06F 9/45533* (2013.01); *G06F 9/5088* (2013.01); *G06F 21/53* (2013.01)

(58) Field of Classification Search

None

See application file for complete search history.

(56) References Cited

U.S. PATENT DOCUMENTS

| | | | | |
|---|---|---|---|---|
| 6,321,314 | B1 * | 11/2001 | Van Dyke | 711/163 |
| 6,973,447 | B1 | 12/2005 | Aguilar et al. | |
| 7,424,601 | B2 * | 9/2008 | Xu | 713/1 |
| 7,865,893 | B1 | 1/2011 | Omelyanchuk et al. | |
| 8,307,359 | B1 | 11/2012 | Brown et al. | |
| 2003/0120856 | A1 * | 6/2003 | Neiger et al. | 711/6 |
| 2005/0193195 | A1 * | 9/2005 | Wu et al. | 713/165 |
| 2006/0015869 | A1 | 1/2006 | Neiger et al. | |
| 2006/0174053 | A1 | 8/2006 | Anderson et al. | |
| 2006/0195715 | A1 | 8/2006 | Herington | |
| 2006/0259734 | A1 | 11/2006 | Sheu et al. | |
| 2006/0282618 | A1 | 12/2006 | Thompson et al. | |
| 2007/0005919 | A1 * | 1/2007 | van Riel | 711/163 |
| 2007/0028244 | A1 | 2/2007 | Landis et al. | |
| 2007/0073916 | A1 * | 3/2007 | Rothman et al. | 710/14 |
| 2007/0074208 | A1 | 3/2007 | Ling et al. | |
| 2007/0079307 | A1 | 4/2007 | Dhawan et al. | |
| 2007/0079308 | A1 | 4/2007 | Chiaramonte et al. | |
| 2007/0156986 | A1 * | 7/2007 | Neiger et al. | 711/163 |
| 2007/0220121 | A1 | 9/2007 | Suwarna | |
| 2007/0283015 | A1 | 12/2007 | Jackson et al. | |
| 2008/0072223 | A1 * | 3/2008 | Cowperthwaite et al. | 718/1 |
| 2008/0104591 | A1 | 5/2008 | McCrory et al. | |

(Continued)

OTHER PUBLICATIONS

"Using VMware® ESX Server System and VMware Virtual Infrastructure for Backup, Restoration, and Disaster Recovery," white paper, © 2005 VMware, Inc. Palo Alto, CA, 18 pages.

(Continued)

*Primary Examiner* — Kevin Verbrugge
*Assistant Examiner* — Arvind Talukdar

(57) ABSTRACT

One embodiment of the present invention is a method including: (a) representing virtual primary disk data and state data of a virtual machine in a unit of storage; (b) exposing the virtual primary disk data of the virtual machine to a guest of the virtual machine to allow the guest to access the virtual primary disk data; and (c) preventing the guest from accessing the state data for the virtual machine.

38 Claims, 18 Drawing Sheets prepare unit to support single VM
NETWORK STORAGE COMMUNICATIONS MEDIUM 107
prepare unit to support single VM
NETWORK STORAGE UNIT 109
NETWORK STORAGE UNIT 111
NETWORK STORAGE UNIT 112
VIRTUALIZATION SYSTEM 105
VIRTUALIZATION SYSTEM 103
121B
121C
STORAGE POOL 121A
RAW STORAGE DEVICE(S) 115A - 115F
RAW STORAGE DEVICE(S) 116A - 116F

(56) References Cited

U.S. PATENT DOCUMENTS

| | | | |
|---|---|---|---|
| 2008/0127182 | A1 | 5/2008 | Newport et al. |
| 2009/0300605 | A1 | 12/2009 | Edwards et al. |

OTHER PUBLICATIONS

"Using Raw Device Mapping," white paper, © 1998-2005 VMware, Inc. Palo Alto, CA, 16 pages.

Vaghani, S., "PAC267-C ESX Server Storage Internals," Presentation Oct. 19, 2005, VMworld2005 Virtualize Now, Las Vegas, Oct. 2005, © 2005 VMware, Inc. Palo Alto, CA, 28 pages.

Khalil, M. & Slovick, B., "ESX Server Storage II Tips and Tricks Raw Disk Mapping," Presentation, VMworld2005 Virtualize Now, Las Vegas, Oct. 2005, © 2005 VMware, Inc. Palo Alto, CA, 49 pages.

Stockman, M. et al., "Centrally-stored and delivered virtual machines in the networking/system administration lab," SIGITE Newsletter vol. 2, Issue 2 (Jun. 2005), ACM Press New York, NY, USA, pp. 4-6.

U.S. Appl. No. 11/960,491, filed Dec. 19, 2007, entitled Implementation of Virtual Machine Operations Using Storage System Functionality, naming Daniel K. Hiltgen and Rene Schmidt as inventors.

U.S. Appl. No. 11/960,460, filed Dec. 19, 2007, entitled Storage Architecture for Virtual Machines, naming Daniel K. Hiltgen and Rene W. Schmidt as inventors.

* cited by examiner

State Data for Virtual Machine

UNIT OF NETWORK STORAGE 400

Base Partition Table

State Data

Virtual Hardware Configuration Data

Snapshot Data

UNIT OF NETWORK STORAGE 500

Base Partition Table

Primary Virtual Disk

State Data

Virtual Hardware Configuration Data

Snapshot Data

UNIT OF NETWORK STORAGE 600

UNIT OF NETWORK STORAGE 700

VIRTUALIZATION SYSTEM 2012
VIRTUAL MACHINE 2013
2015
2021A
2021B
2020
2022
VIRTUALIZATION SYSTEM 2012B
VIRTUALIZATION SYSTEM 2012C
SERVER 2014
STORAGE VOLUME
2033
STORAGE AREA NETWORK 2030
2031A
2031B
2031C
2032A
2032B
2032C
2032D
2032E
2032F
2032G

SECURING VIRTUAL MACHINE DATA

CROSS-REFERENCE TO RELATED APPLICATIONS

This application claims the benefit of U.S. Provisional Application No. 60/871,234, filed Dec. 21, 2006, U.S. Provisional Application No. 60/884,568, filed Jan. 11, 2007, and U.S. Provisional Application No. 60/886,072, filed Jan. 22, 2007.

This application is related to application Ser. No. 11/960,460, entitled "STORAGE ARCHITECTURE FOR VIRTUAL MACHINES" and to application Ser. No. 11/960,491, entitled "IMPLEMENTATION OF VIRTUAL MACHINE OPERATIONS USING STORAGE SYSTEM FUNCTIONALITY," each naming Hiltgen and Schmidt as inventors, each filed on even date herein and each incorporated herein by reference.

BACKGROUND

1. Field of the Invention

One or more embodiments of the present invention relate to virtual machines and, more specifically, to encoding methods for virtual machine state data.

2. Description of the Related Art

In general, state data for a virtual machine may be encoded in some form of computer readable media. In some cases, storage local to an underlying hardware platform can be used. In some cases, storage array technology may be used to share pools of underlying storage amongst multiple computational systems. In some cases, other forms of media including portable, removable media (such as USB mass storage, whether based on flash memory, disk or other storage technology) may be used. Regardless of the storage technologies used, methods are desired whereby aspects of the virtual machine state may be protected or secured from undesired access.

SUMMARY

Some embodiments of the present invention address one or more of the above-identified needs. In particular, one embodiment of the present invention includes a method comprising: (a) representing virtual primary disk data and state data of a virtual machine in a unit of storage; (b) exposing the virtual primary disk data of the virtual machine to a guest of the virtual machine to allow the guest to access the virtual primary disk data; and (c) preventing the guest from accessing the state data for the virtual machine.

BRIEF DESCRIPTION OF THE DRAWINGS

The use of the same reference symbols in different figures indicates similar or identical items.

DESCRIPTION OF EMBODIMENT(S)

Figure 1A:
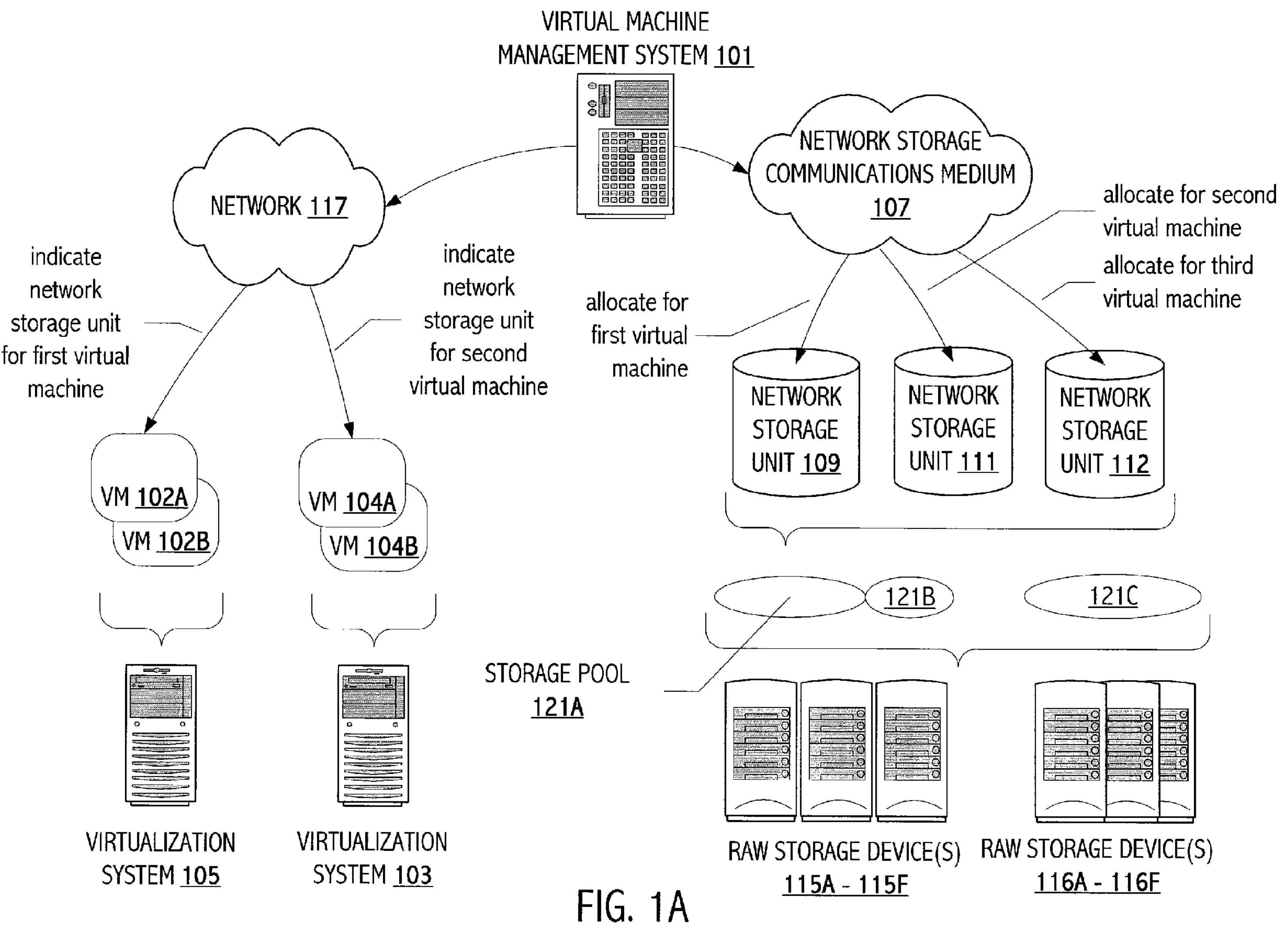
FIG. 1A depicts an example of a system that incorporates network storage system capabilities into virtual machine provisioning.

In accordance with one or more embodiments of the present invention, methods for encoding data used by virtual machines provide isolation and/or security for certain types or portions of virtual machine data while allowing a virtualization system to expose other types or portions of such data to a guest application or operating system. In some embodiments, these methods allow a virtualization system to expose data that encodes a virtual disk, while still securing data such as non-disk data that encodes virtual machine state, virtual hardware configuration and/or snapshot or checkpoint states. Typically, an encoding of virtual machine state includes backing state data corresponding to internal states of devices, memory and other system components virtualized by or for a given virtual machine. As such, read access to such state date (e.g., by a guest) may leak or compromise sensitive information, while write access may afford malicious code or users with an attractive vector for attack.

It has been discovered that a unit of storage can be prepared or presented in a manner that secures virtual machine state data encoded therein from undesired exposure to a guest application or operating system executing in coordination with the virtual machine, while still facilitating access (e.g., by a guest computation) to other data (e.g., virtual primary disk data) also encoded in the unit of storage. In general, undesired exposure of virtual machine state data to a guest of a virtual machine can risk corruption of the state data and, perhaps, other non-disk data. Whether such corruption is accidental or intentional, the corruption can be avoided by limiting guest access to only an appropriate subset of data encoded in the storage unit.

In some virtualization system embodiments, an appropriate subset includes data that is exposed to the guest computation as the information content of a disk virtualized by the virtual machine. In some embodiments, mutually exclusive units of storage are employed for each virtual machine supported in a virtualization system. Typically, in such embodiments, the storage allocated for a particular virtual machine is partitioned in such a way that the virtualization system may expose virtual disk data, while restricting access to non-disk data (e.g., virtual machine state data corresponding to internal states of devices, memory and other system components virtualized). Various techniques, such as encryption and/or use of offsets, may also be implemented to prevent circumvention of the restricted access. In some embodiments, partitions are organized (and partition information is manipulated) such that a reduced apparent size of storage that encodes both disk and non-disk data is presented to the guest and conceals non-disk data beyond an apparent extent of the storage.

The methods may be used for encoding virtual machine data using any of a variety of underlying storage technologies, including local disk storage, network storage, even portable and/or removable media. Accordingly, based on the description herein, it will be apparent to persons of ordinary skill in the art that the term "non-disk data" refers to data that encodes information other than that exposed as a disk by a virtualization system or other similar software system, rather than to any exclusion of underlying storage technology. For concreteness of description, an example of "non-disk data" is backing state data corresponding to internal states of devices, memory and other system components virtualized by or for a given virtual machine. Similarly, an example of "disk data" is information exposed to a guest application or operating system by a virtualization system as a virtual primary (secondary, tertiary . . . ) disk. For avoidance of doubt, underlying encodings of both disk and non-disk data may reside in media that include or constitute disks.

The following describes embodiments in which virtual machine data is encoded in units of storage allocated from pooled network storage shared amongst virtualization systems. Although network storage units provide a useful descriptive context in which to illustrate embodiments, network storage is not essential. Rather, based on the description herein, persons of ordinary skill in the art will appreciate that embodiments of the present invention may be used in the context of other storage technologies and configurations to selectively expose certain portions of virtual machine state while securing and/or isolating other portions.

As used herein, the term network storage refers generally to storage systems and storage array technology, including storage area network (SAN) implementations, network attached storage (NAS) implementations, and other storage architectures that provide a level of virtualization for underlying physical units of storage. In general, such storage architectures provide a useful mechanism for sharing storage resources amongst computational systems. In some cases, computational systems that share storage resources may be organized as a coordinated system (e.g., as a cluster or cooperatively managed pool of computational resources or virtualization systems). For example, in a failover cluster it may be desirable to share (or at least failover) virtual machine access to some storage units. Similarly, in a managed collection of virtualization systems, it may be desirable to migrate or otherwise transition virtual machine computations from one virtualization system to another. In some cases, at least some computational systems may operate independently of each other, e.g., employing independent and exclusive units of storage allocated from a storage pool (or pools) provided and/or managed using shared network storage.

Generally, either or both of the underlying computer systems and storage systems may be organizationally and/or geographically distributed. For example, some shared storage (particularly storage for data replication, fault tolerance, backup and disaster recovery) may reside remotely from a computational system that uses it. Of course, as will be appreciated by persons of ordinary skill in the art, remoteness of shared storage is a matter of degree. For example, depending on the configuration, network storage may reside across the globe, across the building, across the data center or across the rack or enclosure.

While embodiments of the present invention, particularly cluster-organized and/or enterprise scale systems, may build upon or exploit data distribution, replication and management features of modern network storage technology, further embodiments may be used in more modest computational systems that employ network storage technology. For example, even a single computer system may employ SAN-type storage facilities in its storage architecture. Thus, while some embodiments utilize network storage that can be shared and while at least some underlying elements thereof may be remote, persons of ordinary skill in the art will understand that for at least some embodiments, network storage need not be shared or remote.

In some embodiments of the present invention, particularly those that use SAN-type storage arrays, block-level I/O access to virtual machine state data can afford performance advantages. Accordingly, certain embodiments are described in which non-commingled, encapsulated representations of virtual machine state are maintained in distinct storage volumes (or LUNs) of a SAN. Nonetheless, other embodiments, including those that use NAS-type or filesystem-mediated access mechanisms still allow a virtualization system to exploit the described, encapsulation and/or isolation methods to limit access (e.g., by a guest application or operating system) to underlying virtual machine data.

For concreteness, embodiments are described which are based on facilities, terminology and operations typical of certain processor architectures and systems, and based on terminology typical of certain operating systems, virtualization systems, storage systems and network protocols and/or services. That said, the embodiments are general to a wide variety of processor and system architectures (including both single and multi-processor architectures based on any of a variety of instruction set architectures), to numerous operating system implementations and to systems in which both conventional and virtualized hardware may be provided. As described herein, the embodiments are also general to a variety of storage architectures, including storage virtualization systems such as those based on storage area network (SAN) or network attached storage (NAS) technologies, as well as storage architectures that use local disk media, removable media, etc.

Accordingly, in view of the foregoing and without limitation on the range of underlying processor, hardware or system architectures, operating systems, storages architectures or virtualization techniques that may be used in embodiments of the present invention are described. Based on these descriptions, and on the claims that follow, persons of ordinary skill in the art will appreciate a broad range of suitable embodiments.

Computational Systems, Generally

Figure 20:
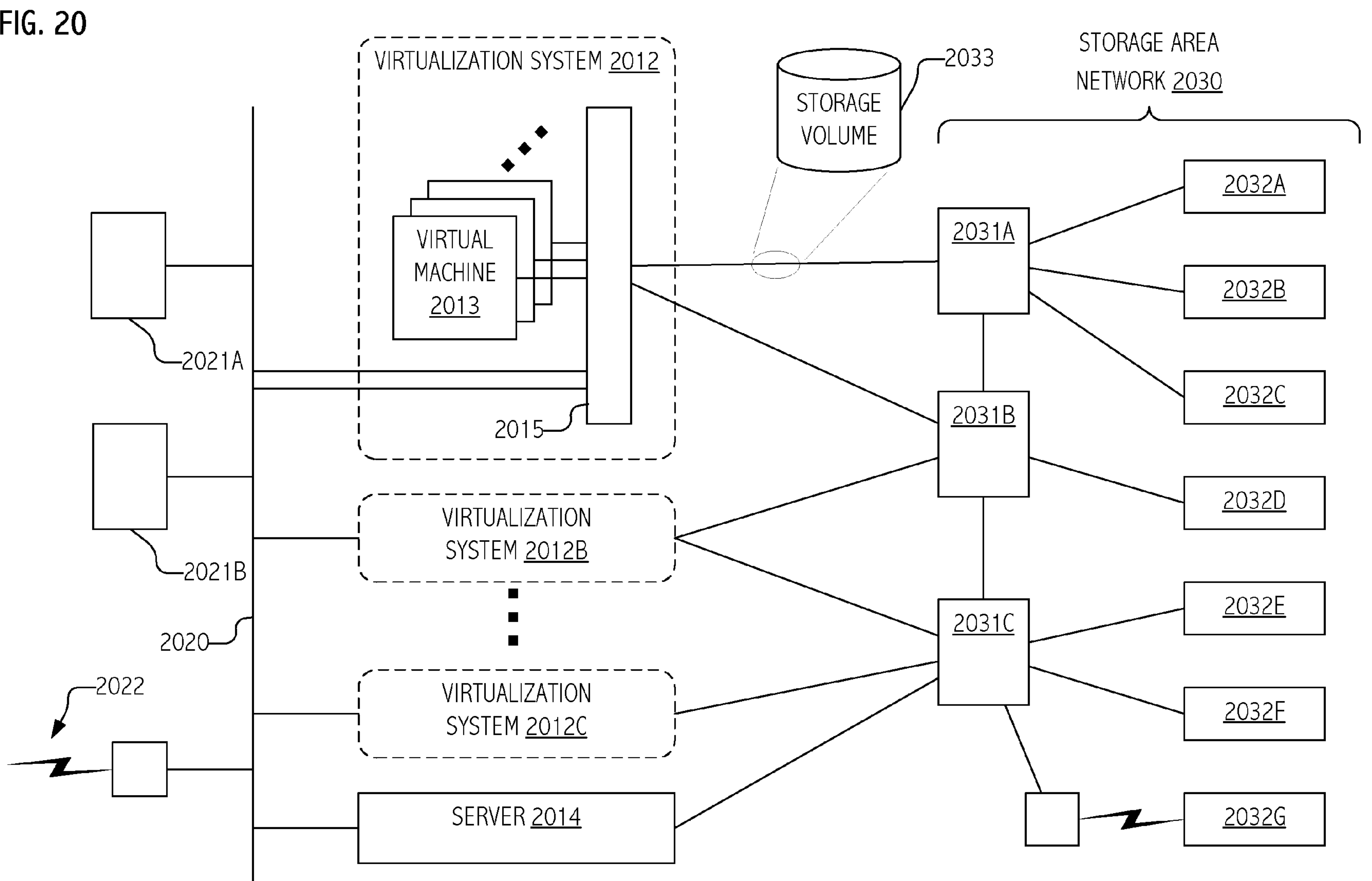
FIG. 20 depicts a collection or cluster of computational systems in which an embodiment of the present invention may be used.

FIG. 20 depicts a collection or cluster of computational systems in which an embodiment of the present invention may be used to limit access (e.g., by a guest application or operating system) to virtual machine data encoded in network storage units. In particular, FIG. 20 illustrates a collection or cluster in which at least a collection of virtualization systems 2012, 2012B, 2012C (but more generally, a mix of virtualization systems and conventional hardware systems such as server 2014) are configured to share storage resources. In the illustrated collection or cluster, constituent computational systems (e.g., virtualization systems 2012, 2012B, 2012C and server 2014) are coupled to network 2020 which is illustrated (for simplicity) as a local area network with client systems 2021A, 2021B and communications interface 2022, but will be more generally understood to represent any of a variety of networked information systems including configurations coupled to wide area networks and/or the Internet using any of a variety of communications media and protocols.

In the illustrated collection, storage area network (SAN) technology is used for at least some storage needs of computational systems participating in the collection. In general, network storage systems (including SAN-based system 2030) provide a level of virtualization for underlying physical storage elements (e.g., individual disks, tapes and/or other media), where the characteristics and/or configuration of particular storage elements may be hidden from the systems that employ the storage. SAN-based systems typically provide an abstraction of storage pools from which individual storage units or volumes may be allocated or provisioned for block level I/O access. In the illustrated collection, a switched fabric topology consistent with Fibre Channel SAN technology is shown in which switches 2031A, 2031B, 2031C and/or directors are used to mediate high bandwidth access (typically using a SCSI, Small Computer System Interface, command set) to an extensible and potentially heterogeneous set of storage resources 2032A, 2032B, 2032C, 2032D, 2032E, 2032F, 2032G, e.g., SATA (Serial ATA) and/or SCSI disks, tape drives, as well as arrays thereof (e.g., RAID, i.e., Redundant Array of Inexpensive Disks). Such resources may be distributed and (if desirable) may provide data replication and/or off-site storage elements. Fibre Channel is a gigabit-speed network technology standardized in the T11 Technical Committee of the InterNational Committee for Information Technology Standards (INCITS).

In general, a variety of different types of interconnect entities, including, without limitation, directors, switches, hubs, routers, gateways, and bridges may be used in topologies (or sub-topologies) that include point-to-point, arbitrated loop, switched fabric portions. Fibre Channel and non-Fibre Channel technologies including those based on iSCSI protocols (i.e., SCSI command set over TCP/IP) or ATA-over-ethernet (AoE) protocols may be used in embodiments of the present invention. Similarly, any of a variety of media including copper pair, optical fiber, etc. may be used in a network storage system such as SAN 2030.

Although not specifically illustrated in FIG. 20, persons of ordinary skill in the art will recognize that physical storage is typically organized into storage pools, possibly in the form of RAID groups/sets. Storage pools are then subdivided into storage units (e.g., storage volumes that are exposed to computer systems, e.g., as a SCSI LUN on a SAN communicating via Fibre Channel, iSCSI, etc.). In some environments, storage pools may be nested in a hierarchy, where pools are divided into sub-pools. In general, persons of ordinary skill in the art will understand the SCSI-derived term LUN (Logical Unit Number) to represent an address for an individual storage unit, and by extension, an identifier for a virtual disk of other storage device presented by a network storage system such as SAN 2030. By convention, the term LUN is used throughout this description; however, based on the description herein, persons of ordinary skill in the art will appreciate that this is done without limitation, and that any suitable identifier may be employed to identify an individual storage unit in embodiments of the present invention.

Embodiments of the present invention may be understood in the context of virtual machines 2013 (or virtual computers) that are presented or emulated within a virtualization system such as virtualization system 2012 executing on underlying hardware facilities 2015. However, in addition, migration from (or to) a computational system embodied as a conventional hardware-oriented system may be supported in some systems configured in accordance with the present invention. Nonetheless, for simplicity of description and ease of understanding, embodiments are described in which individual computational systems are embodied as virtualization systems that support one or more virtual machines.

Although certain virtualization strategies/designs are described herein, virtualization system 2012 is representative of a wide variety of designs and implementations in which underlying hardware resources are presented to software (typically to operating system software and/or applications) as virtualized instances of computational systems that may or may not precisely correspond to the underlying physical hardware.

Overview of Virtualization Systems

The term virtualization system as used herein refers to any one of an individual computer system with virtual machine management functionality, a virtual machine host, an aggregation of an individual computer system with virtual machine management functionality and one or more virtual machine hosts communicatively coupled with the individual computer system, etc. Examples of virtualization systems include commercial implementations, such as, for example and without limitation, VMware® ESX Server™ (VMware and ESX Server are trademarks of VMware, Inc.), VMware® Server, and VMware® Workstation, available from VMware, Inc., Palo Alto, Calif.; operating systems with virtualization support, such as Microsoft® Virtual Server 2005; and open-source implementations such as, for example and without limitation, available from XenSource, Inc.

As is well known in the field of computer science, a virtual machine (VM) is a software abstraction—a "virtualization"—of an actual physical computer system. Some interface is generally provided between the guest software within a VM and the various hardware components and devices in the underlying hardware platform. This interface—which can generally be termed "virtualization layer"—may include one or more software components and/or layers, possibly including one or more of the software components known in the field of virtual machine technology as "virtual machine monitors" (VMMs), "hypervisors," or virtualization "kernels."

Because virtualization terminology has evolved over time and has not yet become fully standardized, these terms (when used in the art) do not always provide clear distinctions between the software layers and components to which they refer. For example, the term "hypervisor" is often used to describe both a VMM and a kernel together, either as separate but cooperating components or with one or more VMMs incorporated wholly or partially into the kernel itself. However, the term "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs is sometimes included in the host OS itself.

Embodiments are described and illustrated herein primarily as including one or more virtual machine monitors that appear as separate entities from other components of the virtualization software. This paradigm for illustrating virtual machine monitors is only for the sake of simplicity and clarity and by way of illustration. Differing functional boundaries may be appropriate for differing implementations. In general, functionality and software components/structures described herein can be implemented in any of a variety of appropriate places within the overall structure of the virtualization software (or overall software environment that includes the virtualization software).

Virtual Machine Monitor (VMM)

In view of the above, and without limitation, an interface usually exists between a VM and an underlying platform which is responsible for executing VM-issued instructions and transferring data to and from memory and storage devices or underlying hardware. A VMM is usually a thin piece of software that runs directly on top of a host, or directly on the hardware, and virtualizes at least some of the resources of the physical host machine. The interface exported to the VM is then the same as the hardware interface of a physical machine. In some cases, the interface largely corresponds to the architecture, resources and device complements of the underlying physical hardware; however, in other cases it need not.

The VMM usually tracks and either forwards to some form of operating system, or itself schedules and handles, all requests by its VM for machine resources, as well as various faults and interrupts. An interrupt handling mechanism is therefore included in the VMM. As is well known, in the Intel IA-32 ("x86") architecture, such an interrupt/exception handling mechanism normally includes an interrupt descriptor table (IDT), or some similar table, which is typically a data structure that uses information in the interrupt signal to point to an entry address for a set of instructions that are to be executed whenever the interrupt/exception occurs. In the Intel IA-64 architecture, the interrupt table itself contains interrupt handling code and instead of looking up a target address from the interrupt table, it starts execution from an offset from the start of the interrupt when a fault or interrupt occurs. Analogous mechanisms are found in other architectures. Based on the description herein, interrupt handlers may be adapted to correspond to any appropriate interrupt/exception handling mechanism.

Although the VM (and thus applications executing in the VM and their users) cannot usually detect the presence of the VMM, the VMM and the VM may be viewed as together forming a single virtual computer. They are shown and described herein as separate components for the sake of clarity and to emphasize the virtual machine abstraction achieved. However, the boundary between VM and VMM is somewhat arbitrary. For example, while various virtualized hardware components such as virtual CPU(s), virtual memory, virtual disks, and virtual device(s) including virtual timers are presented as part of a VM for the sake of conceptual simplicity, in some virtualization system implementations, these "components" are at least partially implemented as constructs or emulations exposed to the VM by the VMM. One advantage of such an arrangement is that the VMM may be set up to expose "generic" devices, which facilitate VM migration and hardware platform-independence. In general, such functionality may be said to exist in the VM or the VMM.

Figure 9:
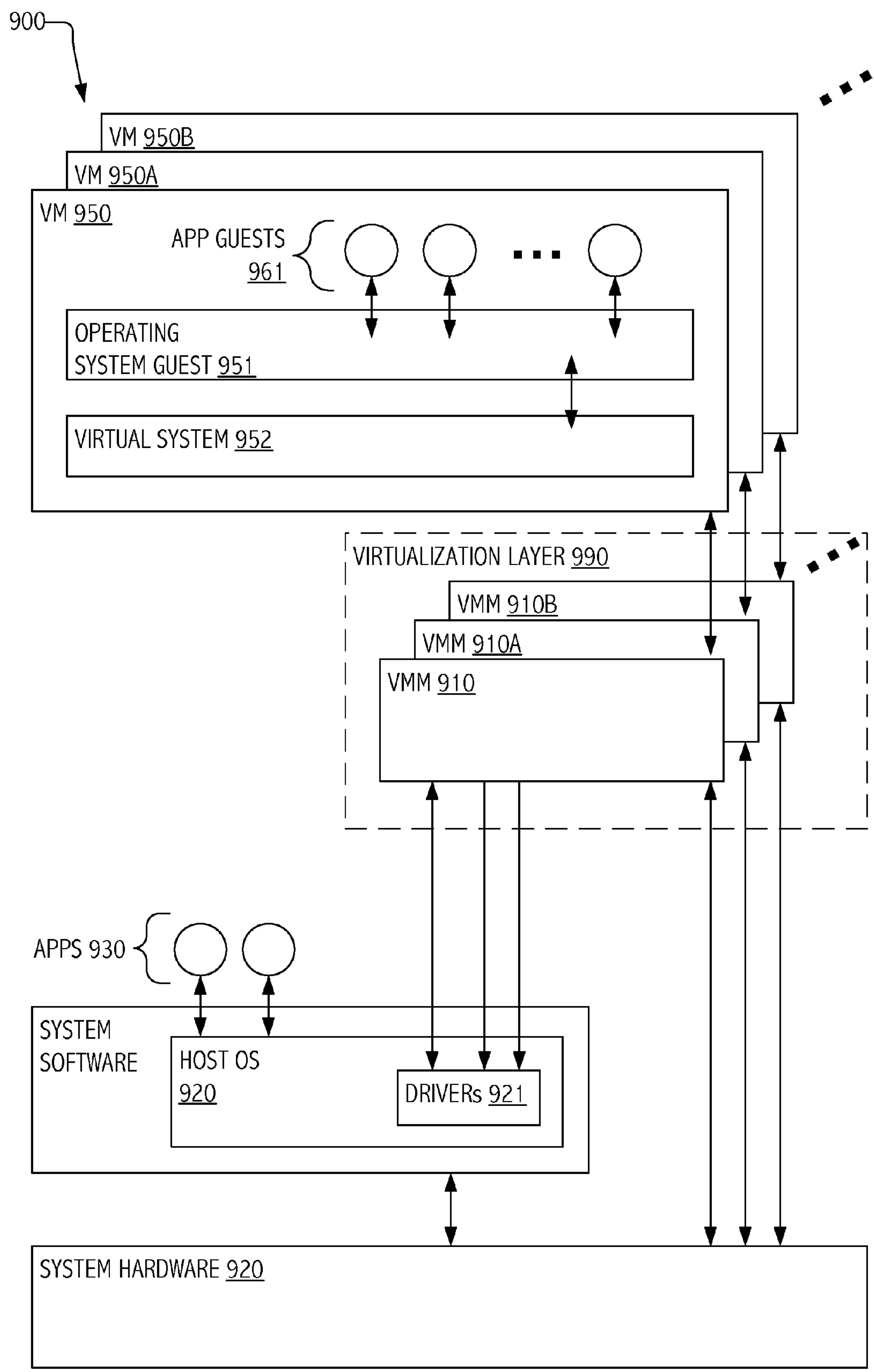
FIG. 9 depicts an embodiment of a virtualization system configuration referred to as an "OS hosted" virtual machine configuration.
Figure 10:
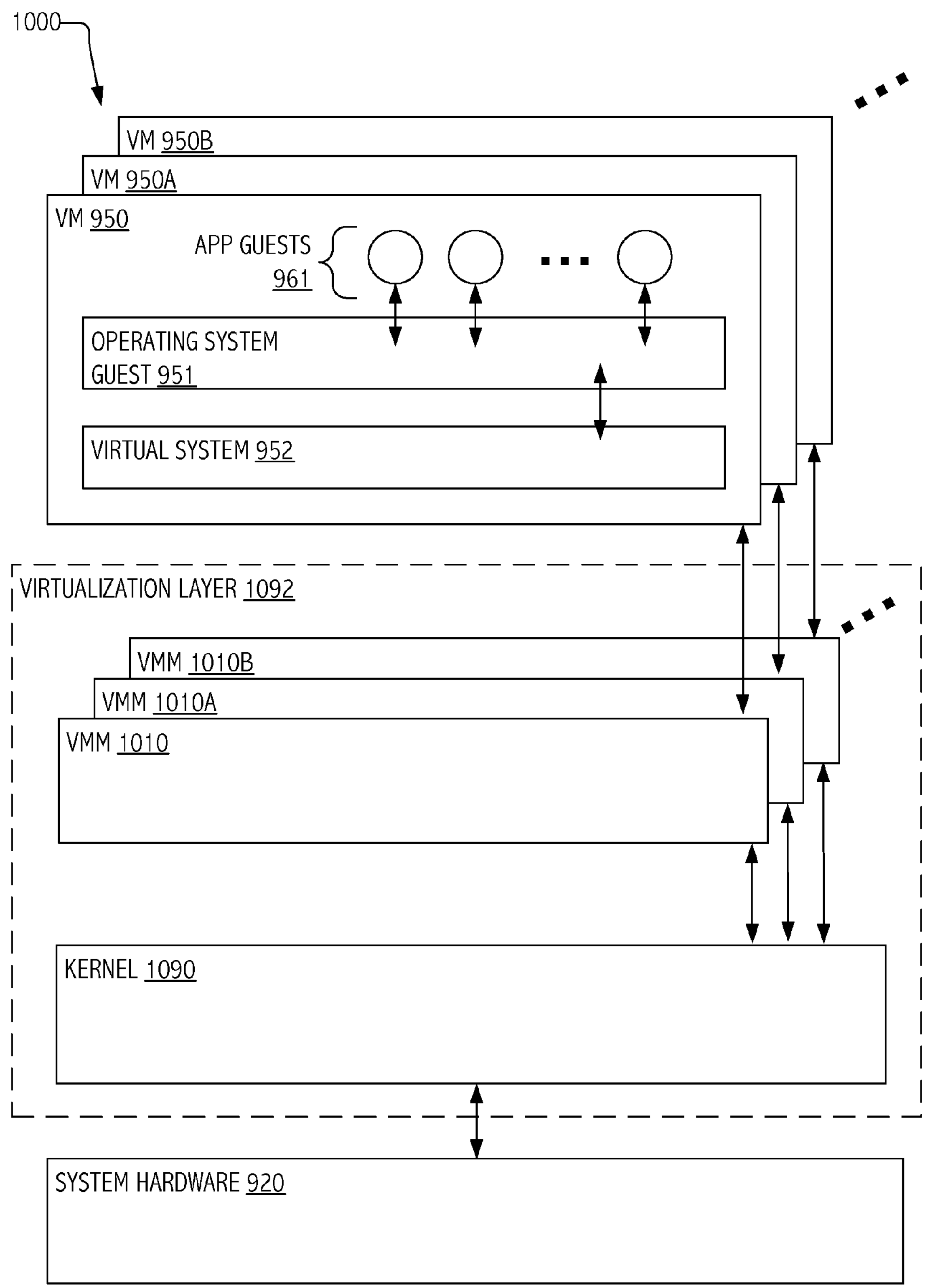
FIG. 10 depicts an embodiment of a virtualization system configuration referred to as a "non-OS hosted" virtual machine configuration.

It is noted that while VMMs have been illustrated as executing on underlying system hardware, many implementations based on the basic abstraction may be implemented. In particular, some implementations of VMMs (and associated virtual machines) execute in coordination with a kernel that itself executes on underlying system hardware, while other implementations are hosted by an operating system executing on the underlying system hardware and VMMs (and associated virtual machines) executed in coordination with the host operating system. Such configurations, sometimes described as "hosted" and "non-hosted" configurations, are illustrated in FIGS. 9 and 10. However, the description herein refers to the physical system that hosts a virtual machine(s) and supporting components, whether in the "hosted" or "non-hosted" configuration, as a virtual machine host. To avoid confusion, the "hosted" configuration will be referred to herein as "OS hosted" and the "non-hosted" configuration will be referred to as "non-OS hosted." In the "OS hosted" configuration, an existing, general-purpose operating system (OS) acts as a "host" operating system that is used to perform certain I/O operations. In the "non-OS hosted" configuration, a kernel customized to support virtual machines takes the place of the conventional operating system.

OS Hosted Virtual Computers

FIG. 9 depicts an embodiment of a virtualization system configuration referred to as an "OS hosted" configuration. Virtualization system 900 includes virtual machines 950, 950A, and 950B and respective virtual machine monitors VMM 910, VMM 910A, and VMM 910B. Virtualization system 900 also includes virtualization layer 990, which includes VMMs 910, 910A, and 910B. VMMs 910, 910A, and 910B are co-resident at system level with host operating system 920 such that VMMs 910, 910A, and 910B and host operating system 920 can independently modify the state of the host processor. VMMs call into the host operating system via driver 921 and a dedicated one of user-level applications 930 to have host OS 920 perform certain I/O operations on behalf of a corresponding VM. Virtual machines 950, 950A, and 950B in this configuration are thus hosted in that they run in coordination with host operating system 920. Virtual machine 950 is depicted as including application guests 961, operating system guest 951, and virtual system 952. Virtualization systems that include suitable facilities are available in the marketplace. For example, VMware® Server virtual infrastructure software available from VMware, Inc., Palo Alto, Calif. implements an OS hosted virtualization system configuration consistent with the illustration of FIG. 9; and VMware® Workstation desktop virtualization software, also available from VMware, Inc. also implements a hosted virtualization system configuration consistent with the illustration of FIG. 9.

Non-OS Hosted Virtual Computers

FIG. 10 depicts an embodiment of a virtualization system configuration referred to as a "non-OS hosted" virtual machine configuration. In FIG. 10, virtualization system 1000 includes virtual machines 950, 950A, and 950B as in FIG. 9. In contrast to FIG. 9, virtualization layer 1092 of FIG. 10 includes VMMs 1010, 1010A, and 1010B, and dedicated kernel 1090. Dedicated kernel 1090 takes the place, and performs the conventional functions, of a host operating system. Virtual computers (e.g., VM/VMM pairs) run on kernel 1090. Virtualization systems that include suitable kernels are available in the marketplace. For example, ESX Server virtual infrastructure software available from VMware, Inc., Palo Alto, Calif. implements a non-hosted virtualization system configuration consistent with the illustration of FIG. 10.

Different systems may implement virtualization to different degrees-"virtualization" generally relates to a spectrum of definitions rather than to a bright line, and often reflects a design choice in respect to a trade-off between speed and efficiency and isolation and universality. For example, "full virtualization" is sometimes used to denote a system in which no software components of any form are included in the guest other than those that would be found in a non-virtualized computer; thus, the OS guest could be an off-the-shelf, commercially available OS with no components included specifically to support use in a virtualized environment.

Para-Virtualization

Another term, which has yet to achieve a universally accepted definition, is "para-virtualization." As the term implies, a "para-virtualized" system is not "fully" virtualized, but rather a guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software. For some, the term para-virtualization implies that the OS guest (in particular, its kernel) is specifically designed to support such an interface. According to this definition, having, for example, an off-the-shelf version of Microsoft Windows XP as the OS guest would not be consistent with the notion of para-virtualization. Others define the term para-virtualization more broadly to include any OS guest with any code that is specifically intended to provide information directly to the other virtualization software. According to this definition, loading a module such as a driver designed to communicate with other virtualization components renders the system para-virtualized, even if the OS guest as such is an off-the-shelf, commercially available OS not specifically designed to support a virtualized computer system.

Unless otherwise indicated or apparent, virtualized systems herein are not restricted to use in systems with any particular "degree" of virtualization and are not to be limited to any particular notion of full or partial ("para-") virtualization.

Provisioning in a Virtualization System Supported with Network Storage

Provisioning Integration

Network storage systems provide virtualized storage where the physical structure of the storage (e.g., individual disks, tapes or other media) is hidden from the user. Network storage systems provide abstractions of storage pools and/or storage units to manage the physical storage. For example, physical storage is often organized into storage pools, possibly in the form of RAID groups/sets. Storage pools can then be subdivided into storage units, which are then exposed to computer systems (e.g., a SCSI LUN on a SAN communicating via Fibre Channel, iSCSI, etc.). In some environments, storage pools may be nested in a hierarchy, where pools are divided into sub-pools.

FIG. 1A depicts an example of a system that incorporates network storage system capabilities into virtual machine provisioning. For purposes of illustration, the system includes a SAN-type implementation of the network storage although, based on the description herein, persons of ordinary skill will appreciate other implementations including, without limitation, NAS-type and other storage systems that provide volume management features. In FIG. 1A, a network storage system includes raw storage devices 115A-115F and 116A-116F (e.g., disks, tapes, etc.). The network storage system also includes network storage communications medium 107. Network storage communications medium 107 may be realized with a variety of technologies (e.g., Fibre Channel, dark fiber, IP over Gigabit Ethernet, ATA over Ethernet (AoE), SONET, ATM, etc.). In addition, the network storage communications medium 107 may also include one or more of a router, switch, etc. Raw storage devices 115A-115F and 116A-116F are logically organized into storage pools 121A-121C. Virtual machine management system 101 allocates network storage unit 109 from storage pool 121A for a first virtual machine 102A. Virtual machine management system 101 also allocates network storage unit 111 from storage pool 121A for second virtual machine 104A and network storage unit 112 for third virtual machine 104B. Allocation of a storage unit may involve both creation of a network storage unit and designation of the network storage unit for a virtual machine or designation of an already created network storage unit for a virtual machine. Virtual machine management system 101 communicates with virtualization systems 105 and 103 via network 117.

In the illustrated configuration, virtualization system 105 supports virtual machines 102A-102B, and virtualization system 103 supports virtual machines 104A-104B. Although virtual machines 102A and 104A are depicted in FIG. 1A on separate virtualization system, embodiments are not so limited. A virtualization system may support larger or smaller numbers of virtual machines, and may support different numbers of virtual machines at different times. Virtual machine management system 101 indicates to virtualization system 105 that network storage unit 109 has been allocated for a virtual machine of virtualization system 105. Likewise, virtual machine management system 101 indicates to virtualization system 103 that network storage units 111 and 112 have been allocated for virtual machines 104A and 104B.

Storage abstractions provided by network storage systems can be directly used by the virtual machine management system to integrate virtual machine provisioning and storage provisioning. For example, one or more storage pools may be assigned to a virtual machine manager. A virtual machine provisioning operation will automatically provision storage units from the assigned storage pools. The degree of exposure of a network storage system to virtual machine management may vary based on needs/structure of a particular entity. The degree of integration of facilities of a network storage system and a virtualization system will vary in accordance with the degree of exposure. A small entity, for example, may wish to task a single group with management of both virtualization systems and storage systems. Full exposure of the raw storage devices can allow for full integration of virtualization management and storage management. Full exposure of raw storage devices to a virtualization management system allows the virtualization management system to organize the raw storage devices into logical units. In such a scenario, the virtualization management system may create the abstraction of storage units directly upon the raw storage devices, or create additional layers of abstraction, such as storage pools.

In another scenario, an entity may outsource management of storage devices or utilize a third-party vendor that provides access to raw storage devices while managed by the third party vendor allowing the entity to retain some degree of control of the raw storage devices. In this third-party scenario, the entity responsible for management of the raw storage devices may expose storage pools to the entity managing virtual machines. Hence, the raw source devices are hidden from the virtual machine management entity, but are provided some latitude in management of the storage. This allows the virtual machine management entity greater ability to tailor the storage to their needs.

A large entity may have an established division for management of their storage devices separate from a division for virtualization. Such a large entity may wish to maintain distinct separation between the divisions. Hence, the virtualization division would only have exposure to units of the network storage as allocated by the storage device division, perhaps as requested by the virtualization division. However, as already stated, some degree of integration of network storage management and virtual machine management satisfies some calls for efficiency.

Figure 2:
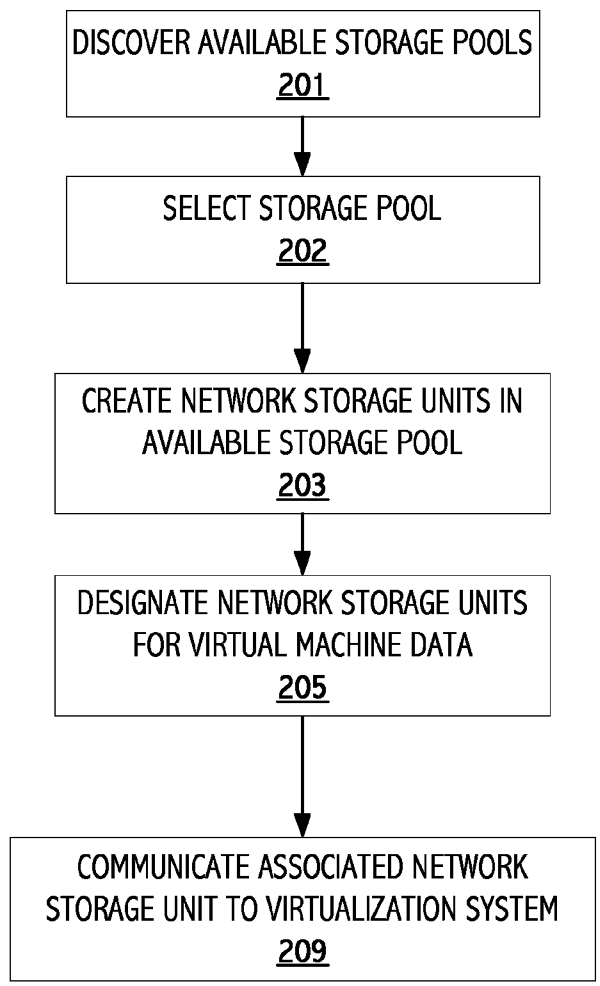
FIG. 2 depicts a flowchart of an embodiment for partial integration of virtual machine provisioning and storage provisioning.

FIG. 2 depicts a flowchart of an embodiment for partial integration of virtual machine provisioning and network storage provisioning. At block 201, available storage pools are discovered. Discovery may involve determining identifying information, total capacity information, etc. Various techniques can be utilized to implement storage pool discovery (e.g., masking). A virtual machine management system may be limited to discovering only those storage pools elected to be exposed by a remote storage management system. A remote management system may elect to expose all storage pools that have been created, or limit exposure to particular storage pools in accordance with certain variables (e.g., location of the raw storage devices, percentage of storage pools, storage pools currently used by virtualization systems, etc.).

At block 202, the storage pool is selected. At block 203, network storage units are created in the selected storage pool. The network storage units are created in accordance with configuration settings that indicate, for example, a given size for each network storage unit. The size may be a default size, a discrete size selected from multiple options, user defined size, etc. At block 205, the created network storage units are designated for virtual machine data. A virtual machine manager may mark each of the created network storage units with a value identifying the network storage units as supporting virtual machines. Marking may be implemented by writing a partition type into a root partition for a network storage unit that has been associated with virtual machines. However, it is possible that a partition type may be overloaded with multiple associations. In addition to, or instead of, partition type marking, a unique value may be written into the network storage unit. For example, a checksum may be coded into the virtual machine data stored in a network storage unit. A discovery operation would then search for both the partition type and the checksum to verify that the network storage unit has been designated for virtual machines. Indication of whether a network storage unit supports a virtual machine may be maintained in a data structure separate and distinct from the network storage units in addition to or instead of marking the created network storage units.

To help illustrate, the following example configuration is provided, which refers to an industry standard Storage Management Initiative Specification (SMI-S). Storage array vendors typically provide APIs for third party management. One example is the industry standard SMI-S, which describes vendor neutral interfaces to manage storage arrays. A virtual machine manager may configure storage (i.e., provision logical representations of raw storage) for virtual machine provisioning automatically or manually. If automatic configuration is implemented, then the virtual machine manager performs Service Location Protocol (SLP) discovery for SNIA SMI-S registered profiles. The virtual machine manager displays a list of discovered network storage in a user-interface and prompts a user to enter a user/password. After the user enters a valid name/password for the discovered network storage, the virtual machine manager authenticates. If manual configuration is implemented, a user enters an IP address (optional port number) and name/password for the network storage management interface. With the entered information, the virtual machine manager authenticates. After authenticating, the virtual machine manager connects to the network storage unit and discovers available storage pools. From the available discovered storage pools, the virtual machine manager divides the pools into primordial pools and data store pools, from which network storage units are created. The virtual machine manager enumerates units (e.g., logical unit numbers (LUNs)) of the network storage from the storage pools, and compares the enumerated units against a list of in-band discovered LUNs across applicable hosts. The virtual machine manager displays root/boot LUNs, known virtual machine LUNs, and all other LUNs separately.

Referring again to FIG. 2, at block 209, a unit of network storage designated for support of a given virtual machine is communicated to a corresponding virtualization system. For example, a virtual machine manager identifying information for a network storage unit communicates with a virtualization layer on the virtualization system. The virtualization layer may then map the identified network storage unit to a host bus adapter exposed by the virtualization system to the corresponding virtual machine.

Of course, creation and designation of network storage units for virtual machines does not necessitate immediate or contemporaneous creation of a virtual machine or communication of a network storage unit to the virtualization system. In general, the division of labor between a virtual machine manager and a virtualization layer of a virtualization system represents an implementation choice and implementations can vary greatly. For example, a virtual machine manager may only perform storage pool discovery and communicate discovered storage pools to the virtualization layer of a virtualization system. The virtualization layer may be responsible for creation of network storage units, designation of the created network storage units for virtual machines, and eventual provisioning of a virtual machine. In another example, a virtual machine manager may perform all operations from storage unit discovery (perhaps even storage unit creation), to provisioning and activation of a virtual machine. In this embodiment, a virtualization layer is tasked with the responsibility of operating and exposing resources to supported virtual machines executing in coordination therewith. Regardless of the division of labor in a particular embodiment, provisioning of a virtual machine involves preparation of a corresponding network storage unit. Preparation involves formatting of a network storage unit, and possibly initialization of the network storage unit with certain data for a virtual machine. Preparation of network storage unit may be entirely performed by a virtual machine manager or a virtualization layer, collectively performed by a virtual machine manager and a virtualization layer, alternately performed, etc.

Mutually Exclusive Network Storage Units for Individual Virtual Machines

Figure 1B:
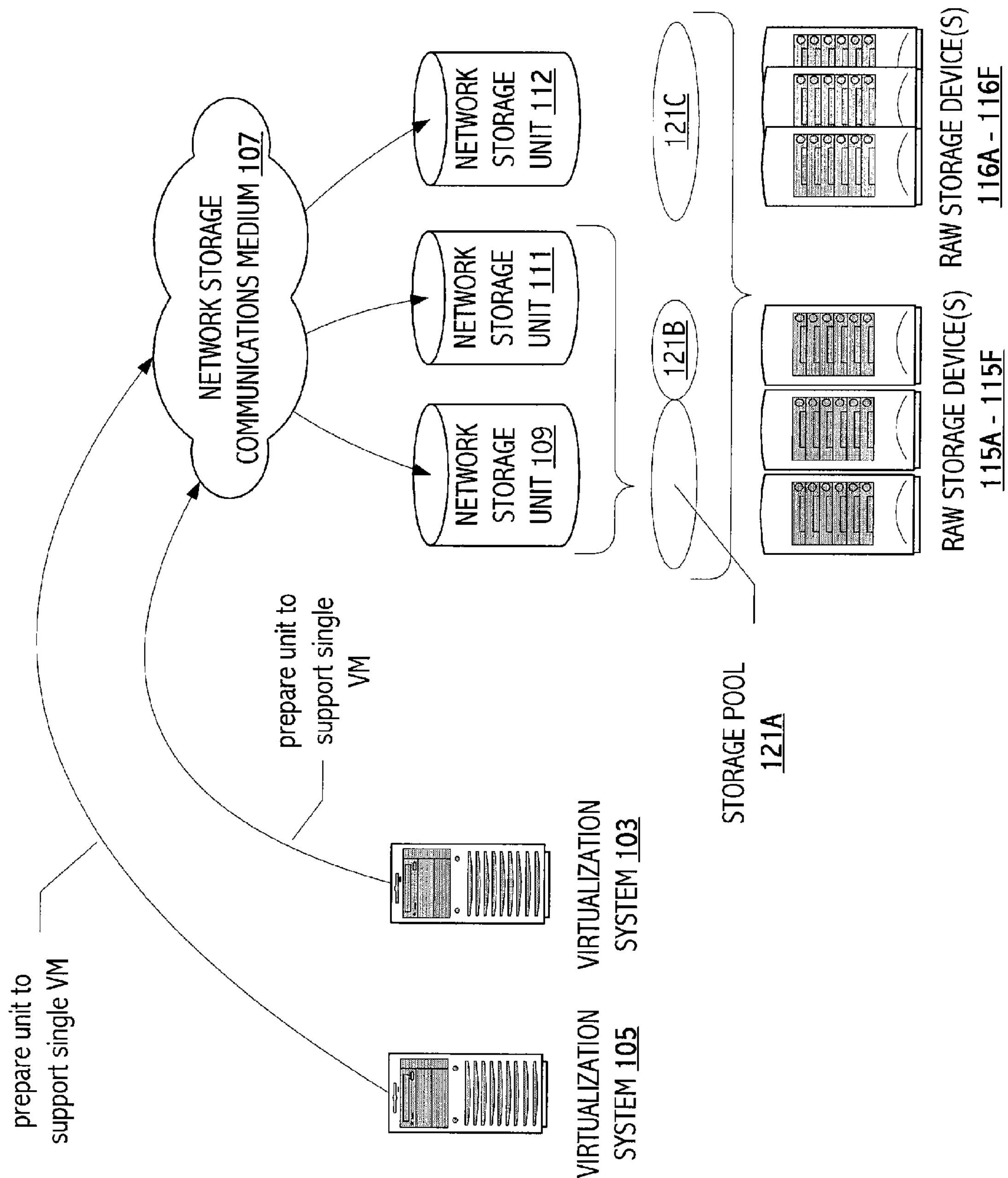
FIG. 1B depicts preparation of allocated network storage units in the system of FIG. 1A.

FIG. 1B depicts preparation of allocated network storage units in the system of FIG. 1A. In FIG. 1B, virtualization system 105 communicates with the network storage system via network storage communications medium 107. Virtualization system 105 communicates with the network storage system to prepare network storage unit 109 to support a single virtual machine. Although the description refers to interactions with network storage units, it should be understood that the units are logical representations and that the interactions are actually with the underlying hardware. Virtualization system 103 prepares separate network storage units 111 and 112 of the network storage system to support respective virtual machines 104A and 104B, which will be executed in coordination with virtualization system 103. The state data, and perhaps other data, of individual virtual machines 102A, 104A, and 104B, are not commingled in network storage units 109, 111, and 112. Preparation of a shared storage unit to support a virtual machine may involve formatting, initialization, encryption, etc. Although FIG. 1B depicts the virtualization system preparing units of network storage, a portion or all of the preparation functionality may be performed by a virtual machine manager as stated above.

Although the above depicts allocation and preparation of a single unit of network storage for each virtual machine, multiple units of network storage may be allocated and prepared for a given virtual machine. Virtual machine provisioning can range from completely encapsulating a single virtual machine in a single network storage unit (i.e., storing state data, virtual primary disk data, virtual hardware configuration data, snapshot data, virtual secondary disk data, etc.) to allocating individual network storage units for each aspect of a virtual machine (e.g., a network storage unit for each of virtual hardware configuration data, state data, virtual primary disk data, boot sector, etc.). In light of these variations, the network storage unit that backs state data of a virtual machine is referred to herein as the base unit, whether or not the unit also encodes additional data.

Figure 3:
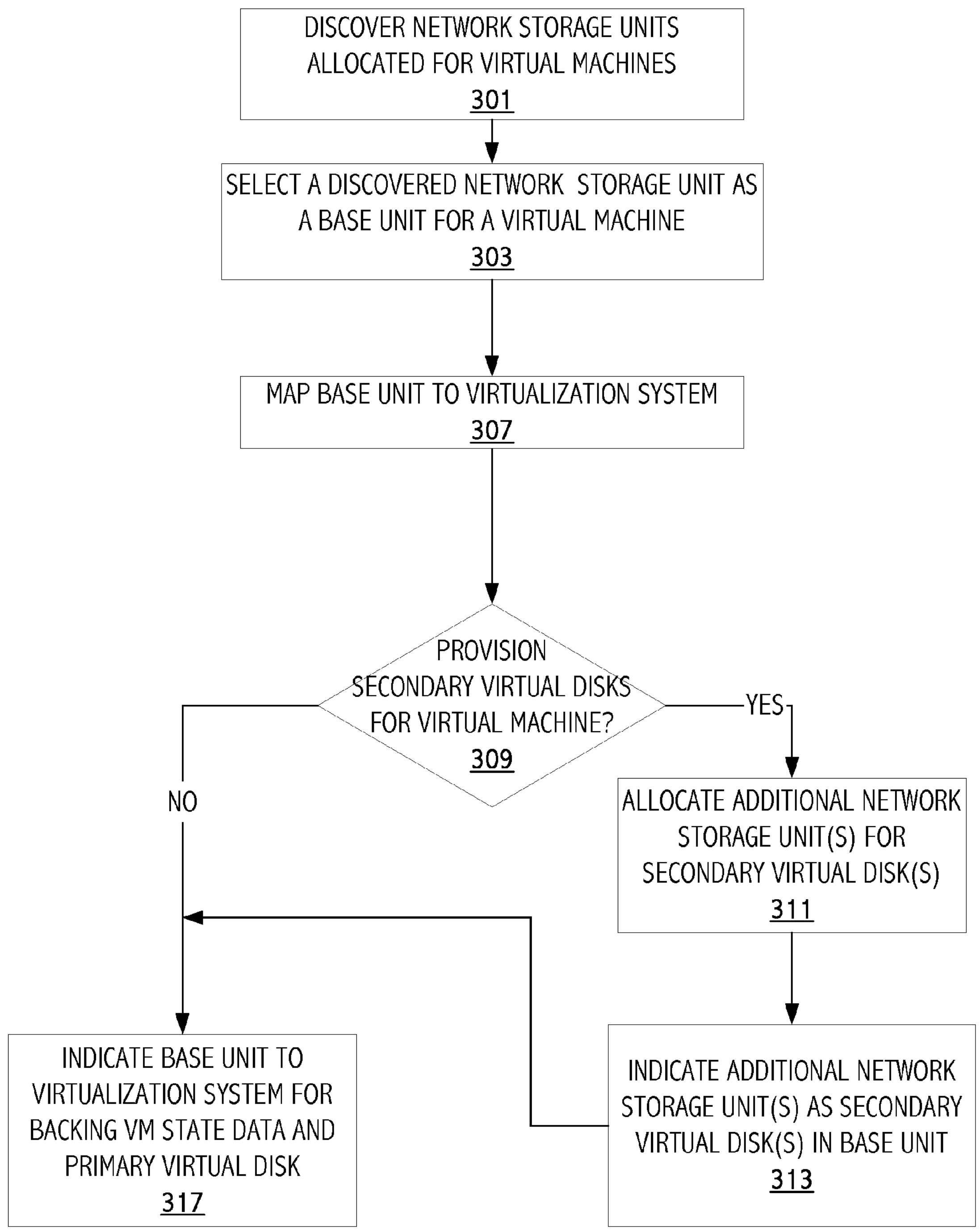
FIG. 3 depicts a flowchart of an embodiment for allocation of multiple storage units for a virtual machine.

FIG. 3 depicts a flowchart of an embodiment for allocation of multiple units of network storage for a virtual machine. At block 301, network storage units available for virtual machines are discovered. At block 303, a network storage unit is selected as a base unit for a virtual machine. At block 307, the base unit is mapped to a virtualization system. At block 309, it is determined whether secondary virtual disks are to be provisioned for the virtual machine. If secondary virtual disks are to be provisioned, then control flows to block 311. If secondary virtual disks are not to be provisioned, then control flows to block 317.

At block 311, one or more additional units of network storage are allocated for one or more secondary virtual disks. At block 313, the additional network storage units for the secondary disks are indicated. Various techniques can be utilized to indicate the additional units of network storage allocated for the virtual secondary disks of the virtual machine. For example, indications may be written into the base unit to identify the additionally allocated units of network storage as virtual secondary disks (e.g., the base unit will identify a globally unique ID, such as SCSI Inquiry VPD page 0x83, for a secondary virtual disk). The globally unique ID will allow the virtual secondary disks to be automatically detected and attached to the virtual machine. The indications of the additional network storage units as virtual secondary disks may alternatively, or in addition, be communicated to the virtualization system. The secondary virtual disk network storage units may also be marked to distinguish them from base units. Control flows from block 313 to block 317. At block 317, the base unit is indicated to the virtualization system at least for backing state data of the virtual machine.

For a given embodiment, the degree of separation of virtual machines across network storage units can range from only separating state data for virtual machines to separating all data for virtual machines. For example, a first network storage unit may encode a library of possible virtual hardware configuration. While the state data of two distinct virtual machines would be backed on separate network storage units, these two distinct virtual machines may point to the same or different virtual hardware configuration data in the library. In another example, two distinct virtual machines may share a virtual secondary disk on a network storage unit while their respective virtual primary disks and state data are stored on mutually exclusive network storage units.

In general, prevention of commingling of state data of the state virtual machines may be enforced implicitly or explicitly. For example, an embodiment of a virtual machine manager may not present a network storage unit already encoding state data of a virtual machine during virtual machine provisioning. However, in some cases, a given embodiment of a virtual machine manager may preserve the availability for provisioning multiple virtual machines onto a single network storage unit, perhaps for performance comparison purposes, dwindling resources, etc. Of course, the preserved option would involve mounting a file system as intermediary between a virtual machine and a network storage system, thus losing integration of the virtualization system in the network storage system and manageability of virtual machines at network storage unit granularity.

As mentioned above, data that encodes a virtual machine typically includes multiple data components: state data, virtual primary disk (sometimes referred to as virtual primary disk data), virtual hardware configuration data (e.g., type of processor, type of virtual network card, type of virtual storage host bus adapter (HBA), amount of memory, etc.), snapshot data, and zero or more virtual secondary disks (sometimes referred to as virtual secondary disk data). Those of ordinary skill in the art should appreciate that in various embodiments these multiple data components may be aggregated together, separated differently across different embodiments, further divided, etc. The state data of a virtual machine indicates execution state of a virtual machine at a particular time whether suspended or not suspended. For example, state data indicates current data in all or a portion of a memory of a virtual machine (e.g., instruction and/or value data in the virtual machine's RAM, cache, registers, etc.). A boot disk (e.g., a boot sector and OS disk image) may reside on the primary virtual disk, virtual secondary disks, or not be present at all for "network boot" of virtual machines. Virtual hardware configuration data indicates a configuration of a virtual machine. For example, virtual hardware configuration data indicates a type of virtual processor, type of virtual network card, type of virtual storage HBA, amount of virtual RAM, virtual chipset, type and size of a virtual primary disk, etc.

Figures 4, 5, 6, 7:
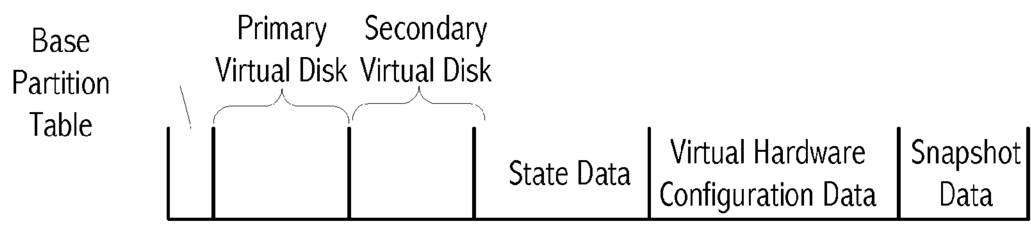
FIG. 4 depicts an organization of a network storage unit that encodes state data for a single virtual machine.
FIG. 5 depicts an organization of a network storage unit that encodes virtual machine data with the exception of a virtual primary disk.
FIG. 6 depicts an organization of a network storage unit that encodes virtual machine data including virtual primary disk data.
FIG. 7 depicts an organization of a network storage unit that encodes virtual machine data including multiple virtual disks.

FIG. 4 depicts an organization of network storage unit 400 that only encodes state data for a single virtual machine. FIG. 5 depicts an organization of network storage unit 500 that encodes virtual machine data with the exception of a virtual primary disk. Network storage unit 500 has been prepared to encode, or currently encodes, state data, virtual hardware configuration data, and snapshot data for a virtual machine. A root partition table has been written into network storage unit 500 to indicate individual partitions for each of the encoded data components. Presumably, virtual primary disk data is encoded on another network storage unit. It should be understood that the order of data illustrated in FIGS. 5, 6 and 7 is for illustrative purposes alone, and is not meant to be limiting. A network storage unit can be organized in a number of different ways.

FIG. 6 depicts an organization of network storage unit 600 that encodes virtual machine data including a virtual primary disk. Network storage unit 600 has been prepared to encode, or currently encodes, a virtual primary disk, state data, virtual hardware configuration data, and snapshot data for a virtual machine. A root partition table has been written into network storage unit 600 to indicate individual partitions for each component of the encoded data. If there are any virtual secondary disks for the virtual machine, they are implemented with a separate network storage unit.

The virtual machine manager or virtualization layer of the corresponding virtualization system should allocate enough space in the state data portion of a network storage unit to support the configured memory size of the virtual machine. To support memory growth in the future, the virtual machine manager or virtualization layer (provisioning functionality) may choose to over-allocate space to accommodate the growth. The provisioning functionality may later change a virtual disk size or the supported virtual RAM size by extending the unit of network storage, updating a top-level partition data structure, and moving the data around (e.g., to the end of the network storage unit in the data structure outlined above). If the virtual disk size is being expanded, the virtual disk exposed to a guest will now report a larger size. If RAM is being added, the state data region will be increased. The state data region and other regions are typically small compared to virtual disks, so this reconfiguration should be a relatively fast operation. The provisioning computation may also choose to use a fragmented model without relocating regions when growing/shrinking the network storage unit.

FIG. 7 depicts an organization of network storage unit 700 that encodes virtual machine data including multiple virtual disks. Network storage unit 700 has been prepared to encode, or currently encodes, a virtual primary disk, a virtual secondary disk, state data, virtual hardware configuration data, and snapshot data for a virtual machine. A root partition table has been written into the network storage unit to indicate individual partitions for each of the virtual machine data components. The virtualization layer on a virtualization system can examine the root partition table to read and write to the various partitions. The state data for the virtual machine is written directly into the state data partition. On boot, the virtual machine gets access to the entire network storage unit and sees its virtual primary disk (typically with the installed operating system) and virtual secondary disk, and ignores the other data partitions.

Regardless of the particular embodiment, allocating mutually exclusive network storage units for distinct virtual machines dispenses with a traditional file system to store data components of the virtual machine. Dispensing with the traditional file system allows, for example, a storage virtualization engine to communicate directly with a network storage unit manager (assuming a virtual machine stack that comprises a virtual machine, a storage virtualization engine (i.e., instantiated code that presents virtual storage to a virtual machine), a network storage manager (e.g., a SAN agent), and a communication medium interface). The intermediary file system that would reside between the storage virtualization engine and the network storage manager has been obviated. With at least mutually exclusive network storage units backing state data of a virtual machine, the entire virtual machine state is encapsulated in a single base unit.

Securing Virtual Machine Data

Since a virtual machine has complete access to an entire network storage unit, a guest may also have access to the entire network storage unit. It would be prudent to restrict access to non-disk data. Exposing the state data, virtual hardware configuration data, or snapshot data can potentially leak sensitive information to a guest of the virtual machine. Actions by a guest, whether accidental or intentional, could result in the deletion or corruption of this data. Restricting guest access to non-disk data provides security and reliability. Furthermore, the potential harmful and/or undesirable exposure of non-disk data to a guest of a virtual machine is not limited to virtual machines with data stored in remote shared storage. For example, risks may also exist for a virtual machine with data stored in remote unshared storage, storage local to the hardware system that supports a given virtual machine (e.g., flash memory plugged into a USB port, a local disk, etc.).

To address this concern, non-disk data is isolated from disk data. A method for isolating disk data from non-disk data would be to limit guest access to a partition of a network storage unit that encodes a virtual primary disk, and zero or more partitions that encode virtual secondary disks. For example, the virtualization layer on a virtualization system, perhaps a virtual machine monitor in the virtualization layer, provides a virtualized SCSI disk to the virtual machine that only includes a virtual disk partition. To the virtual machine, this looks like a regular virtual disk with its own partition table and partitions. A guest of the virtual machine is no longer able to access the non-disk data.

Figure 8A:
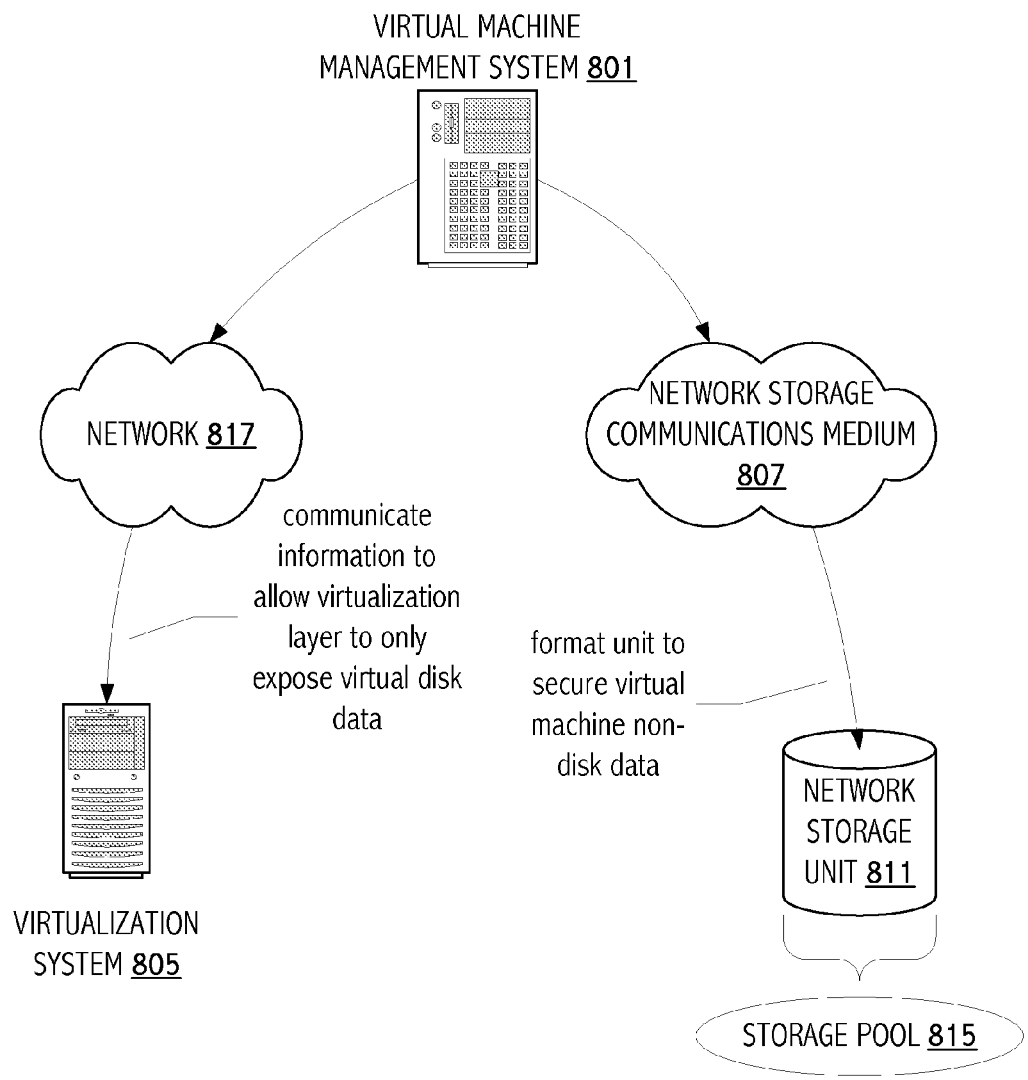
FIG. 8A depicts a virtualization system securing non-disk data.

FIG. 8A depicts a virtualization system securing non-disk data. In FIG. 8A, virtual machine management system 801 formats network storage unit 811 of storage pool 815 to at least secure state data, if not all non-disk data of the virtual machine. Virtual machine management system 801 formats network storage unit 811 via communications medium 807.

Figure 8B:
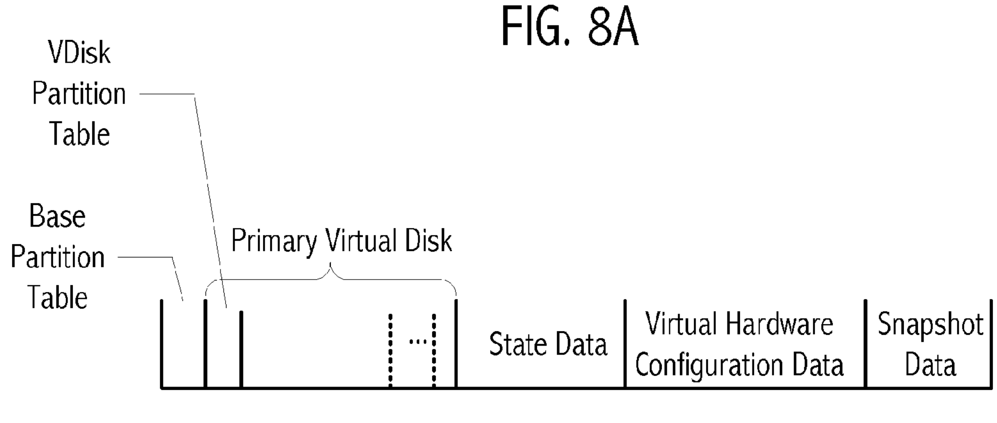
FIG. 8B depicts an organization of an encoding of a storage unit to secure non-disk data.

FIG. 8B depicts an organization of an encoding (in a unit of network storage 800) of virtual machine data. The encoding seeks to isolate and to secure non-disk data. In the illustrated encoding, a pair of nested partition tables has been written: a root partition for the entire network storage unit, and a second partition table for the primary virtual disk partition. In the illustrated encoding, the primary virtual disk partition has also been further partitioned. By nesting partitions, the illustrated encoding allows a virtualization system to expose only contents of the primary virtual disk to the corresponding virtual machine and any guest operating system/applications executing thereon.

Referring again to FIG. 8A, after formatting network storage unit 811, virtual machine management system 801 communicates information concerning the primary virtual disk partition to the virtualization layer of virtualization system 805, which in turn exposes only the virtual disk data.

Although the embodiment(s) described with reference to FIGS. 8A and 8B employs a unit of network storage, further embodiments of the inventive techniques can more generally be applied to other types of storage. For example, a local storage may be partitioned into multiple partitions. At least two partitions are allocated to a virtual machine, but a guest of the virtual machine is restricted to accessing the one or more partitions that encode disk data. The local storage may be organized in accordance with a file system. Different permission levels are assigned to folders. A folder that includes disk data for various virtual machines is set with a lower level permission than is granted to guests. A different folder that includes non-disk data is set with a privileged permission level granted to the virtualization layer, but not granted to guests. Permission levels may be applied to individual files in addition to setting access permissions for folders or instead of setting permission for folders.

Another method for restricting access to non-disk data hides the non-disk data from a guest while exposing a global partition table. For example, the non-disk data, whether or not organized into different partitions, are located at a location in a partition or storage known to the virtualization layer. The size of the storage, folder, or partition, is truncated when reported to a guest to hide the region occupied by non-disk data. Hiding the region occupied by non-disk data obviates modification of I/O requests with offsets.

Methods that align the beginning of a virtual disk with the beginning of a physical storage for a virtual machine can also be used to conceal non-disk data from a guest. A partition table for the virtual disk is stored in a non-disk data partition. When a guest requests access to the beginning of the storage, the second partition table is fetched and exposed to the guest. Attempted access by the guest to other than the beginning of the storage is allowed if not off the truncated end.

Operations of Virtual Machine Directly Supported by Network Storage

Access Requests from a Virtual Machine Guest

As described above, in some embodiments of the present invention, a virtual machine directly accesses data encoded in a unit of network storage rather than via an intermediate file system interface. To enforce security and restrict access by a guest of a virtual machine to at least state data, if not all non-disk data, the virtualization layer intercepts requests from a guest of a virtual machine.

Figure 11:
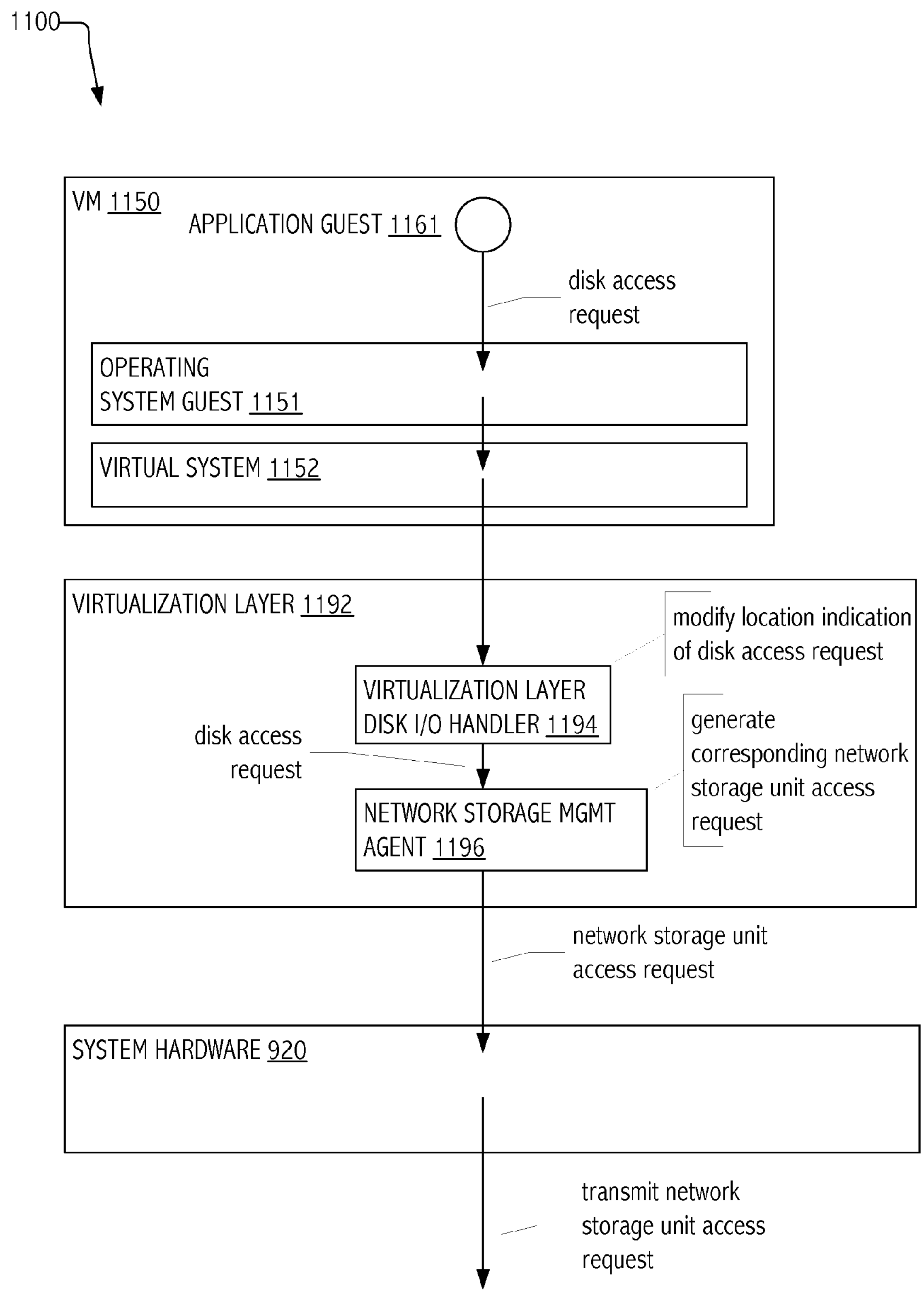
FIG. 11 depicts an embodiment of a virtualization layer intercepting disk access requests from a guest of a virtual machine.

FIG. 11 depicts an embodiment of a virtualization layer intercepting disk access requests from a guest of a virtual machine. In FIG. 11, virtualization system 1100 includes virtual machine 1150, virtualization layer 1192, and underlying system hardware 920. Application guest 1161 executing in virtual machine 1150 initiates a disk access request. The disk access request traverses operating system guest 1151 and virtual system 1152. Virtualization layer disk I/O handler 1194 receives the disk access request. Virtualization layer disk I/O handler 1194 modifies an indication of the location to be accessed. For example, in some realizations, an offset is added to appropriately align the access request in the virtual disk partition of a network storage unit that encodes the virtual disk. The modified access request is then passed to network storage management agent 1196 (e.g., the modified access request is passed to an I/O interface for network storage). The virtualization layer (e.g., the disk I/O handler) may perform additional operations to prevent access to non-disk data by a guest. For example, the virtualization layer may verify that a modified location indication falls within boundaries designated for access requests destined for a network storage unit. If a modified location indication falls within the boundaries, then the corresponding access request is valid and is allowed to proceed. Otherwise, the guest is notified that the access request failed or has been denied. Network storage management agent 1196 generates a corresponding network storage unit access request (e.g., I/O command). The network storage access request is then passed to underlying system hardware 920. From system hardware 920, the access request is transmitted to the network storage unit that encodes the virtual machine's virtual disk.

For a response to an access request, the reverse of the operations depicted in FIG. 11 are applied. A response received by system hardware 920 would be passed to virtualization layer 1192. In virtualization layer 1192, the network storage management agent 1196 extracts a payload from the response and passes the payload (e.g., read request data) to the virtualization layer disk I/O handler 1194. The virtualization layer disk I/O handler 1194 then modifies any location indication to conceal non-disk data locations from the application guest 1161 (e.g., subtracts an offset) and, perhaps, the operating system guest 1151. The virtualization layer disk I/O handler 1194 passes the response with the modified location indication to the virtual system 1152. The application guest 1161 eventually receives the response to its initiated disk access request with the modified location indication. Although the above describes an embodiment for preventing access to certain, if not all, non-disk data by a guest of a virtual machine, the scope of restriction may be expanded to include the virtual machine data. In general, access to non-disk virtual machine data may be limited to a virtualization layer that supports the corresponding virtual machine.

As previously stated, other techniques for concealing non-disk data from a guest may be implemented that avoid modifying requests with an offset. For example, storage size may be truncated when reported to a guest to conceal a region occupied by non-disk data. The previously described alignment technique also avoids modifying access requests from guests with offsets. Avoiding offset modification can be implemented with a less performance intensive set of operations (e.g., introducing a compare operation and a branch predict operation to the I/O path instead of a set of operations to compute and apply an offset).

Exposing Non-Disk Data Locations in a Network Storage Unit for Backup and Snapshot Although non-disk data locations of the network storage unit are hidden from guests of a virtual machine, non-disk data locations are exposed to a corresponding virtualization system for certain management operations, such as backup operations and snapshot operations. A component of a virtualization layer (e.g., a network storage management agent) has direct access to a network storage unit. Direct access to a network storage unit allows state data to be written directly to a backing network storage unit for efficient backup of the state data. It is not necessary, however, for functionality that performs a write for backing state data to be resident in the virtualization layer or embodied as a separate agent. Embodiments may implement the backup writing functionality in the virtual system exposed to a virtual machine, in an agent that is separate from the virtual machine and the virtualization layer, etc.

Similarly, snapshot functionality may be implemented in the exposed virtual system, in the virtualization layer, in a separate agent, as an agent in the virtualization layer, etc. Regardless of the particular implementation, by exploiting direct access to a network storage system and an n:1 relationship between network storage units and virtual machines, a virtualization system can leverage facilities of a network storage system. In general, a network storage system application programming interface allows direct access by a virtualization system to snapshot facilities of a network storage management system. Allocation of mutually exclusive network storage units for distinct virtual machines allows one to use network storage management system facilities without the overhead from an intermediary file system.

Modern storage arrays typically provide the ability to snapshot a storage volume. A snapshot is typically implemented as copy-on-write implemented at the storage array layer where a second volume is created and linked to the first volume. To the client of the array, a snapshot results in a second volume that has the exact state of the original volume at the point the snapshot was taken. Arrays provide further capabilities such as refreshing a snapshot to bring it back into synchronization with the base volume, as well as severing a link between the two volumes to make clones. Since state data for a single virtual machine is completely stored in a base network storage unit, taking a snapshot for a virtual machine can be implemented with a write operation to the base unit and a network storage management system snapshot operation of the base unit, and, perhaps, any supplemental network storage units for the virtual machine.

Figure 12:
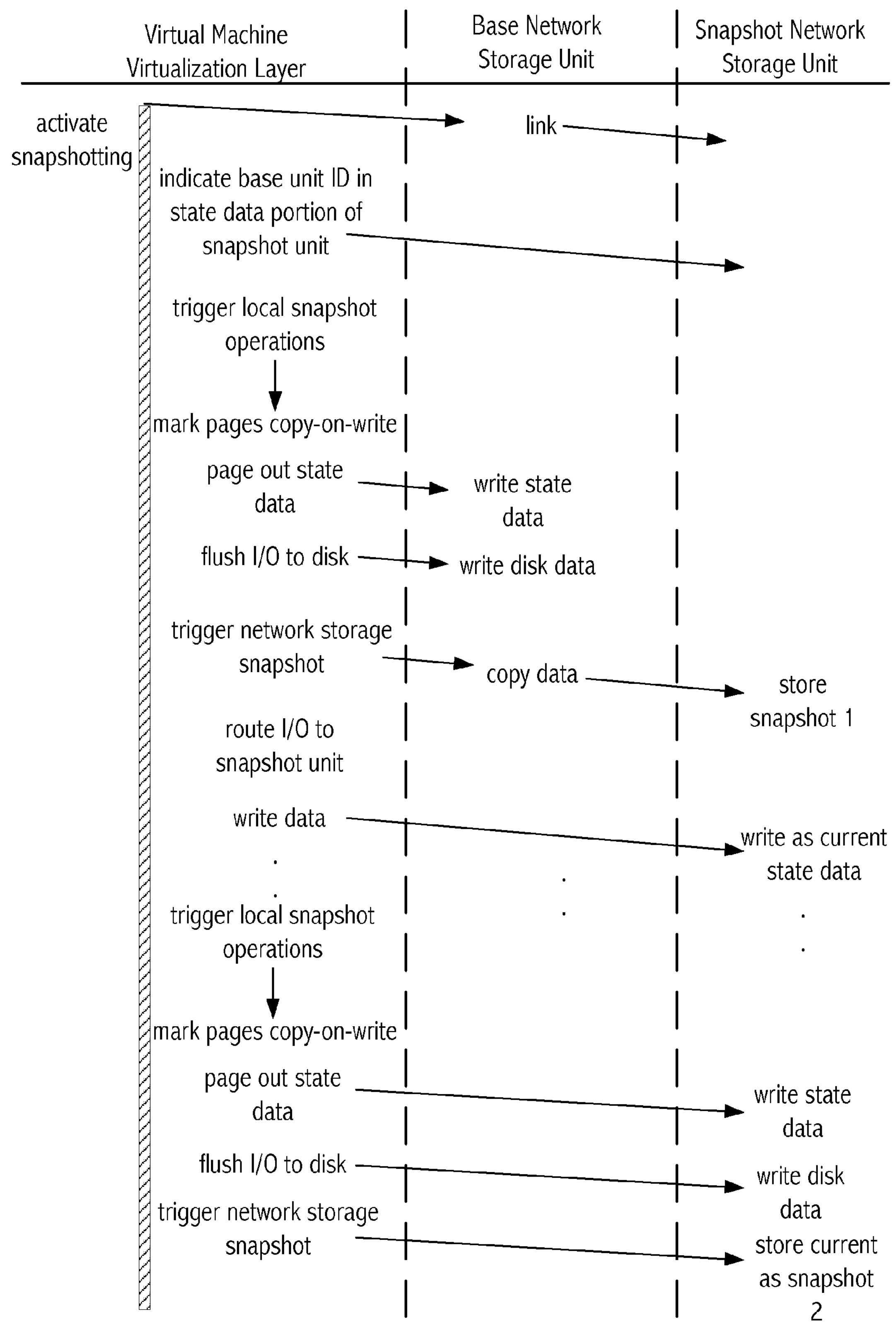
FIG. 12 depicts an embodiment of snapshot operations for a virtual machine.

FIG. 12 depicts an embodiment of snapshot operations for a virtual machine. At the virtualization layer of a virtual machine, snapshotting is activated. This may be done using a variety of trigger mechanisms. For example, snapshotting may be activated by a manual event, a time based event, in accordance with a configuration file, a notification or command received via a communications medium, etc. Next, the snapshot activation causes a snapshot network storage unit to be linked to a base network storage unit that encodes at least state data of the virtual machine. Next, the snapshot network storage unit is identified to the virtualization layer. Next, the virtualization layer indicates the identity of the base unit in the state data portion (or some other portion, such as the virtual hardware configuration data portion) of the snapshot network storage unit. Next, local snapshot operations are then triggered. The virtualization layer marks pages of the state data as copy-on-write. Upon writing to one of these pages, the virtualization layer pages out state data. The state data is written to the base unit. The virtualization layer also causes I/O to be flushed out to the primary virtual disk, which in this example is in the base network storage unit.

Once this point is reached where a consistent state can be conveyed for the virtual machine, the virtualization layer triggers a snapshot of the base network storage unit to the linked snapshot network storage unit. This causes the underlying facilities of the network storage (e.g., network storage management system) to copy the data of the base network storage unit and store it as “snapshot 1” in the snapshot network storage unit. The virtualization also begins routing I/O to the snapshot network storage unit, which is written as current state data for the virtual machine. This process repeats as long as snapshot activation continues, storing a given number of snapshots in a different network storage unit.

FIG. 12 further depicts subsequent snapshots (i.e., snapshot children) being stored in the same network storage unit as the parent snapshot. Of course, the parent snapshot may only include a delta of the data stored in the base network storage unit. In the illustrated embodiment of storing children in the same network storage unit as the parent snapshot, the next trigger of local snapshot operations again causes pages to be marked as copy-on-write. State data is paged out to the snapshot network storage unit. The I/O is flushed out to disk on the snapshot network storage unit. The trigger of network storage snapshot does not make a copy, but stores the data that has been paged out and flushed out as “snapshot 2.” As already stated, embodiments can be envisioned that store snapshots in different network storage units, in the base network storage unit, etc.

In the context of arrays and volumes, the VM snapshot is now stored in a separate volume (or volumes if multiple disks are in use by the VM). Multiple VM snapshots can be supported by performing multiple snapshots on the array. In the state data portion of the base volume, references can be stored to the snapshot parent base volume, so the virtual machine manager can discover the parent child relationship between snapshots. In this approach, the copy-on-write is not implemented in the virtual machine or in a file system layer, but in the storage array layer.

Typically, storage arrays change the unique ID of the snapped volume to distinguish it from the base volume. Many operating systems, especially those with advanced multipath capabilities, use the unique ID of a volume as the ID for their disks instead of relying on the SCSI target and unit numbers. In a virtualization environment, the same ID for the virtual disk can be exposed to a guest(s) of a virtual machine; otherwise, drivers within an OS guest may become confused and may crash the OS. Within the state data portion of the base disk, or even a separate location, the “initial” unique ID for the volume(s) is recorded. When using snapped volumes, the virtualization layer will interpose and replace the snapped ID with the initial ID so that the OS guest is unaware that it is operating on a snapshot. Of course, this functionality is not limited to snapshotting the state data. A snapshot may be taken of the entire base unit, a very active portion of the state data (assuming there is a very active and less active state data portions), the primary virtual disk and state data, all disks and state data, etc.

Although an initial snapshot includes all data (e.g., all state data, all data in a base unit, etc.), subsequent snapshots may be taken in accordance with a variety of snapshotting techniques. For example, each snapshot in a series of snapshots may include all data at the particular moment of the snapshot, or only the difference between the current snapshot and a predecessor snapshot, which is not necessarily the root snapshot or immediately preceding snapshot. For example, a snapshot x may only include differences between itself and snapshot x-3. The snapshot may include a reference to the snapshot x-3, which may include another reference to the base snapshot. Another approach may track snapshot relationships in a table, linked list, etc. Those of ordinary skill in the art should appreciate that a variety of data structures may be utilized to encode snapshots and/or snapshot relationships.

Figure 13:
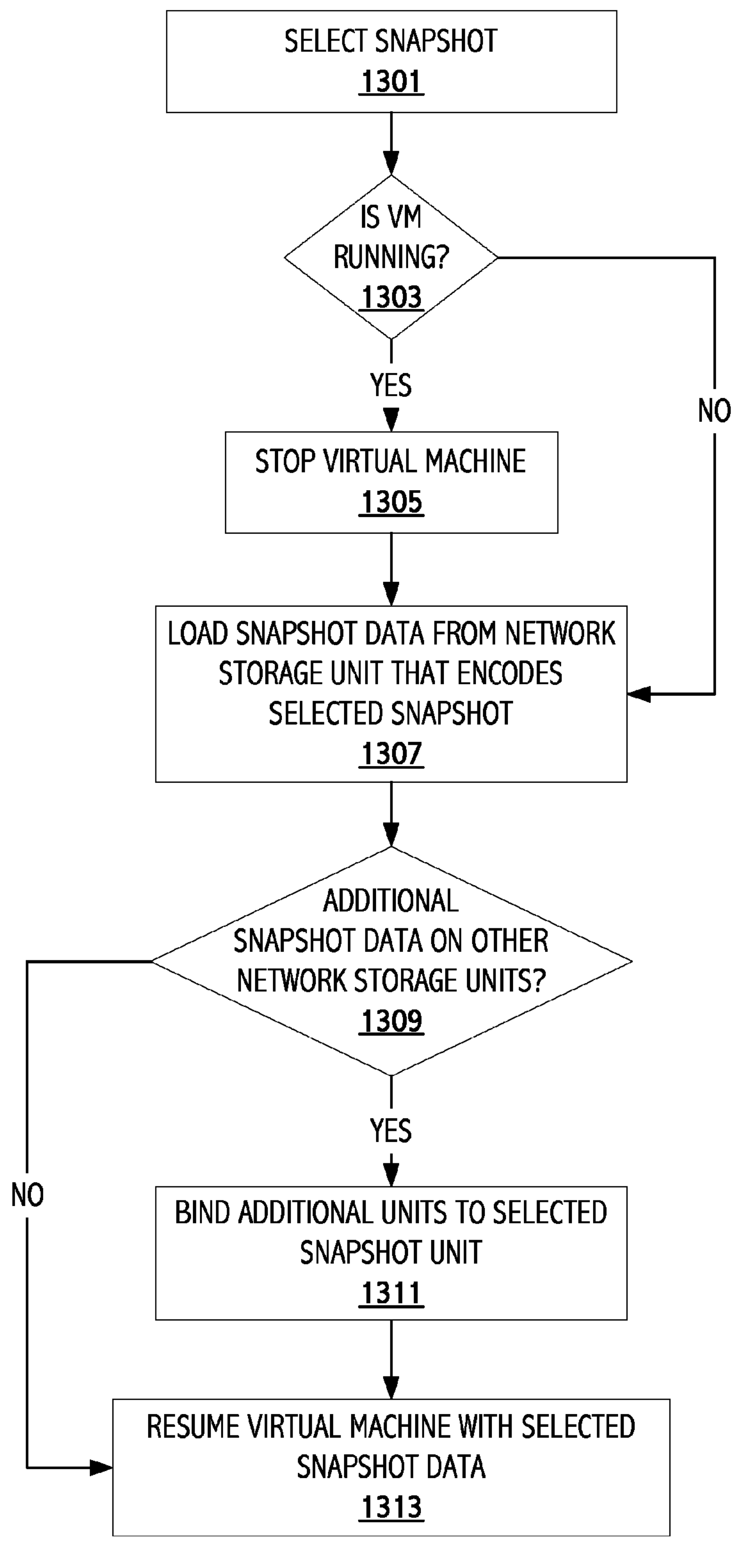
FIG. 13 depicts a flowchart of an embodiment of a method for activating a snapshot.

FIG. 13 depicts a flowchart of an embodiment of a method for activating a snapshot. At block 1301, a snapshot of a virtual machine is selected. At block 1303, it is determined whether the virtual machine is running. If the virtual machine is running, then control flows to block 1305. If the virtual machine is not running, then control flows to block 1307.

At block 1305, the virtual machine is stopped. Although the virtual machine is stopped in the illustrated embodiment, embodiments in accordance with the present invention may suspend the virtual machine, thus preserving running state if so desired. In either case, the virtual machine state (in network storage) will be consistent and suitable for snapshot. At block 1307, the selected snapshot data is loaded from the corresponding network storage unit. At block 1309, it is determined whether additional corresponding snapshot data resides on other network storage units (e.g., snapshots of virtual secondary disks that correspond to the selected snapshot). If additional snapshots exist, then control flows to block 1311. If there are no other corresponding snapshots for the virtual machine, then control flows to block 1313. At block 1311, the corresponding snapshots in the other network storage units are bound to the selected snapshot. At block 1313, the virtual machine is resumed with the selected snapshot.

Maintaining snapshots of virtual machines allows activation of a virtual machine(s) at different points in time, which can be used for a myriad of purposes such as testing, agentless back-up, offline virus scanning and other integrity checks, etc. When reverting to a previous snapshot, it may be desirable to discard an intermediate snapshot and maintain a snapshot that reflects a most recent state. For example, a snapshot to be deleted may correspond to state results from a failed test or experiment. This can also be used for applications that reset and erase any changes made by users upon every reboot, such as a kiosk application. Discarding or deleting the intermediate snapshot may reduce complexity and possibly improve performance. In a snapshot hierarchy that maintains children snapshots with deltas, a to-be-deleted snapshot may be rolled back into the predecessor intermediate snapshot, thus effectively deleting the intermediate snapshot. Of course, the snapshot to be discarded is not necessarily an intermediate snapshot, and may be the most recent snapshot. Those of ordinary skill in the art should appreciate the availability of methods for deleting a child snapshot.

Virtual Machine Management with Network Storage Facilities

In addition to the ability to snapshot, virtual machine management may include functionality to clone and/or migrate virtual machines (running or offline). These functions are typically implemented using redo-logs with copy-on-write semantics. With a network storage unit devoted to a single virtual machine, redo logs have been discarded along with the independent intermediary file system. With access to built-in facilities of a network storage system, virtual machine management can leverage the network storage management operations to efficiently manage virtual machines (e.g., clone, migrate, discovery, replicate for disaster recovery, etc.). The facilities are exposed to a virtualization system with an application programming interface for network storage management ("storage API") and exposure of network storage units. The functionality that makes calls to the storage API may be implemented as part of a virtual machine manager that resides on a server communicatively coupled to virtualization system, part of a virtual machine manager that resides on a virtualization system, etc.

Discovery

Instead of initiating a communication session with every virtualization system, or accessing a centralized database of instantiated virtual machines, a virtual machine management system can efficiently and automatically discover virtual machines by examining visible network storage units. If a virtual machine management system does not have visibility into storage units of a network storage system or has limited visibility and access, then network storage units may be made visible by modifying the network storage mapping and masking configuration. For example, a partition table on all visible network storage units may be examined. A unique partition type, or other marker as discussed previously, may be used to facilitate automatic detection of these network storage units allocated for virtual machines. Within the context of arrays, existing array-based masking and mapping primitives can be used to control access to virtual machines. Additionally, locking capability may be included within a portion (e.g., partition) of a network storage unit to allow multiple virtualization systems to cooperate when accessing a single VM.

Figure 14:
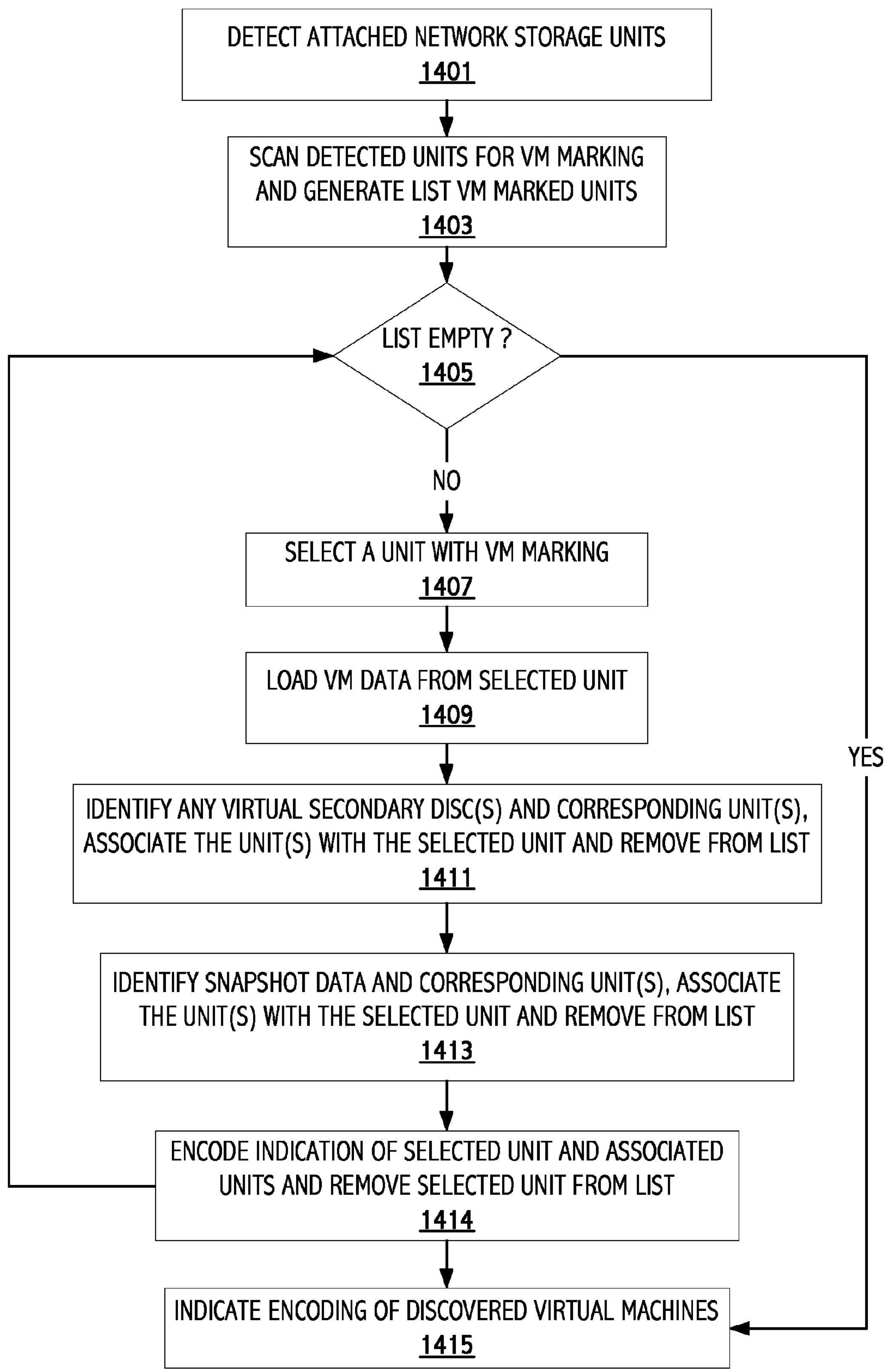
FIG. 14 depicts a flowchart of an embodiment of a method for automatic discovery of virtual machines.

FIG. 14 depicts a flowchart of an embodiment of a method for automatic discovery of virtual machines. At block 1401, attached network storage units are detected. At block 1403, the detected units are scanned for virtual machine markings and a list of the detected units with virtual machine markings is generated. At block 1405, it is determined whether the list is empty. If the list is empty, then control flows to block 1415. If the list is not empty, then control flows to block 1407.

At block 1407, one of the virtual machine marked units is selected from the list. At block 1409, virtual machine data is loaded from the selected network storage unit. At block 1411, the loaded data is examined to identify any virtual secondary disk(s) and their corresponding network storage unit(s). Any identified network storage units are associated with the selected unit, and removed from the list. Of course, embodiments may mark network storage units that encode virtual secondary disks or other non-state data differently. Hence, detect and scan operations, such as those depicted in blocks 1401 and 1403, will yield a list of base network storage units. At block 1413, snapshot data and corresponding network storage units are identified. Any identified corresponding network storage units are associated with the selected unit and removed from the list. At block 1414, an indication of the selected unit and associated units is encoded. Control flows from block 1414 back to block 1405. If there are no remaining unselected network storage units in the list, then control flows to block 1415. At block 1415, the encoding of discovered virtual machines is indicated (e.g., presented via a user interface, stored in a file, etc.).

Moving a Virtual Machine

Instead of streaming pages of memory across an IP network, network storage system facilities can be leveraged to implement local move and remote move of a virtual machine. Moving a virtual machine locally transitions virtual machine computations to a different virtualization system, while maintaining data for the virtual machine in the same network storage unit. Moving a virtual machine remotely transitions virtual machine computations to a different virtualization system and relocates virtual machine data to a different network storage unit.

Figure 15:
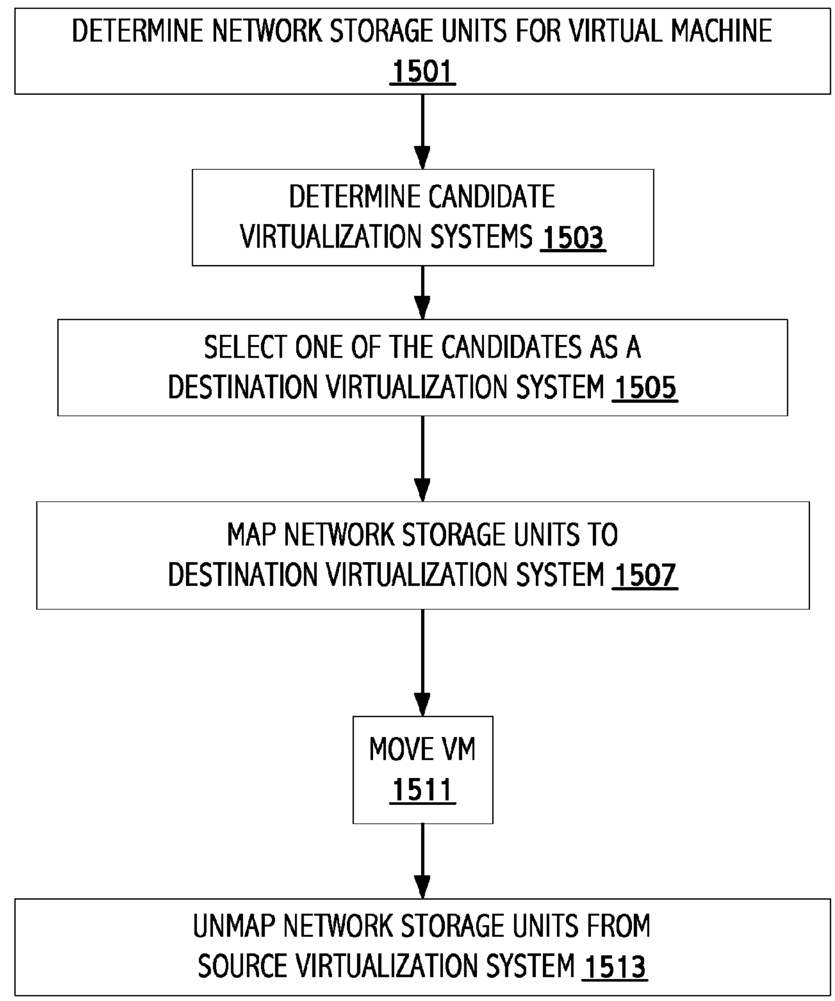
FIG. 15 depicts a flowchart of an embodiment of a method for performing a move of a virtual machine.

FIG. 15 depicts a flowchart of an embodiment of a method for performing a move of a virtual machine. At block 1501, the network storage units associated with the virtual machine to be moved are determined. At block 1503, candidate virtualization systems are identified. A set of storage arrays that encode the determined network storage units (e.g., LUNs) is determined, along with their target identifications. Virtualization systems that have visibility of the determined array and target IDs are deemed suitable for hosting the virtual machine. At block 1505, one of the candidates is selected as a destination virtualization system. At block 1507, the determined network storage units are mapped to the destination virtualization system. At block 1511, the virtual machine is moved from the source virtualization system to the destination virtualization system. At block 1513, the network storage units are unmapped from the source virtualization system.

Figure 16:
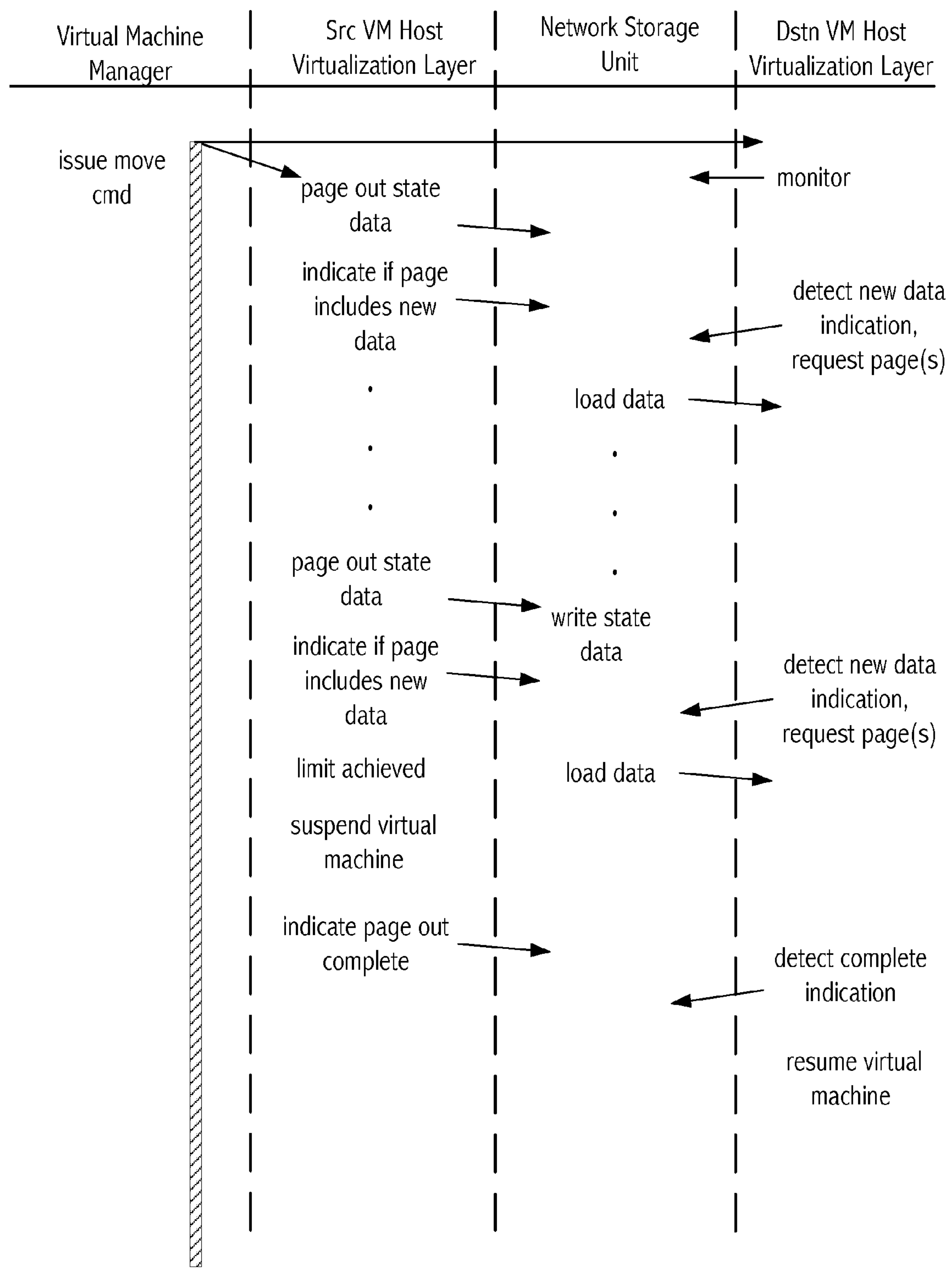
FIG. 16 depicts an embodiment of a local move command operation for a virtual machine.

FIG. 16 depicts an embodiment of a local move command operation for a virtual machine. A virtual machine manager (e.g., on a virtualization system, on a virtual machine management server, etc.) issues a move command to a virtualization layer of a source virtualization system. The move command is also issued to a virtualization layer of a destination virtualization system. Responsive to receiving the command, the destination virtualization system virtualization layer begins monitoring a network storage unit that encodes data of the virtual machine to be moved. In addition to, or instead of, monitoring, the destination virtualization system may wait to receive a notification. The move command causes the virtualization layer of the source virtualization system to begin paging out state data to the network storage unit. This can be done in an incremental fashion. For example, dirty pages may be tracked and re-synchronized iteratively. The source virtualization system also indicates if a page includes new data in the network storage unit. Instead of, or in addition to, writing an indication into the network storage unit, the source may inform the destination directly, (e.g., over an IP network). If the virtualization layer of the destination virtualization system detects the new data indication, then it requests the one or more new pages. Requested pages are then loaded into the destination virtualization system by the virtualization layer. These operations repeat until a given limit is achieved. The limit may be percentage of data paged out, time limit, user input, etc. Once the limit is achieved, the virtualization layer of the source virtualization system suspends the virtual machine. After suspending the virtual machine, the source virtualization system indicates in the network storage unit that page out is complete. Upon detecting indication of completion, the virtualization layer of the destination virtualization system resumes the virtual machine in accordance with data loaded from the network storage unit.

As previously stated, the movement of a virtual machine may be across a local-area network or a wide-area network. For network storage systems that support wide area replication (e.g., a SAN that supports wide-array replication), the supported facility can be employed to implement movement of a virtual machine across a wide-area network.

Figure 17:
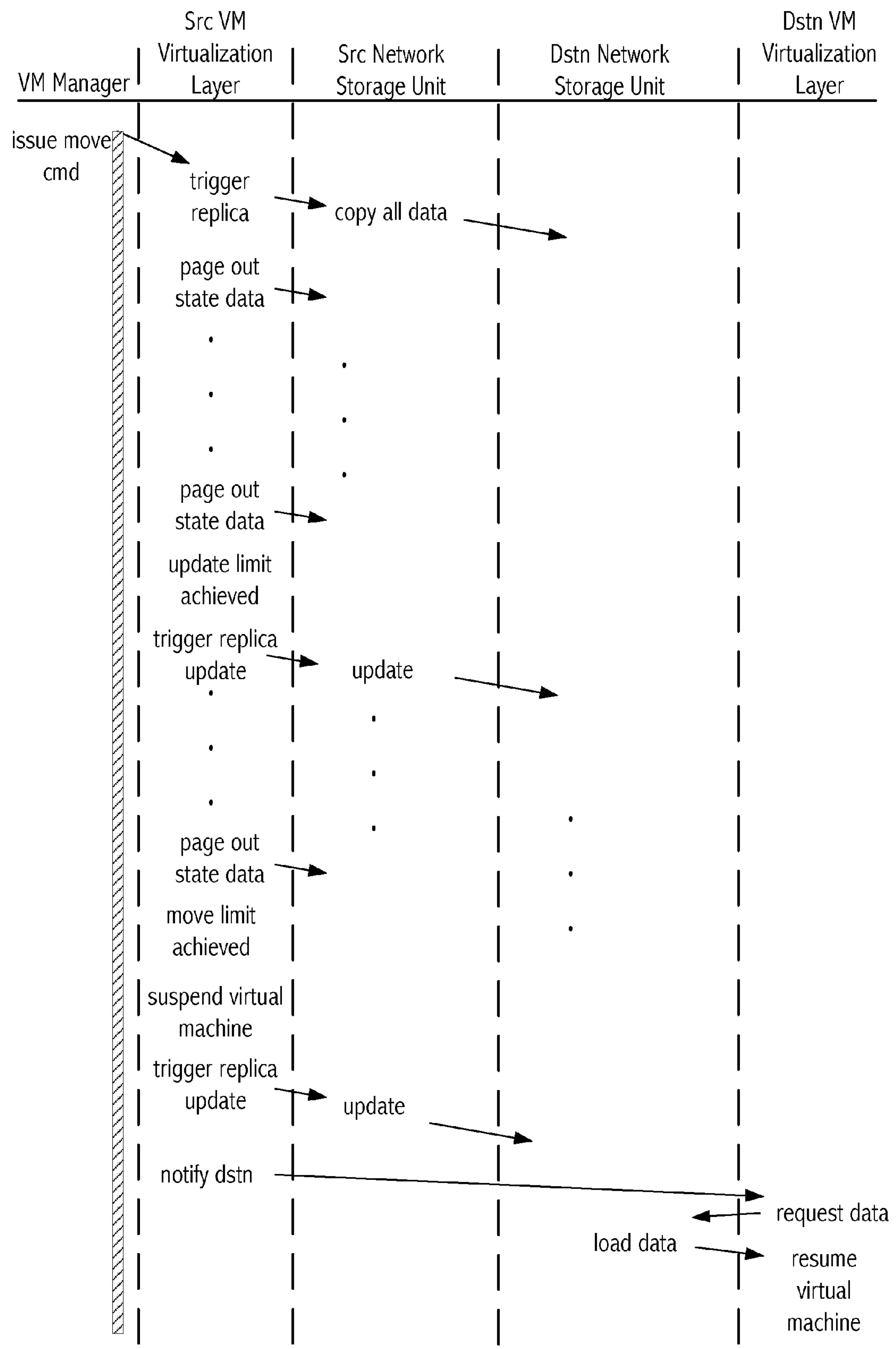
FIG. 17 depicts an embodiment of a remote move command operation for a virtual machine.

FIG. 17 depicts an embodiment of a remote move command operation for a virtual machine. A virtual machine manager issues a move command to a source virtual machine virtualization layer. The move command causes the virtualization layer at the source virtualization system to trigger a replica of the data at a source network storage unit. The network storage system(s) for both the source and destination network storage units perform a replication operation and copy all data from the source network storage unit to the destination network storage unit. The virtualization layer at the source virtualization system then begins to page out state data to the source network storage unit. Upon achieving an update limit, the virtualization layer at the source virtualization system triggers a replica update. The network storage system updates the data in the destination network storage unit with new data from the source network storage unit. The paging out of state data and replication updates repeats until a limit for the move is achieved. Upon achieving the move limit, the virtualization layer at the source virtualization system triggers a final replica update. After the final replica update, the virtualization layer at the source virtualization system notifies a virtualization layer at a destination virtual machine host. In response to the notification, the virtualization layer at the destination virtualization system requests the data in the destination network storage unit for the virtual machine. Once the data has been loaded into the destination virtual machine host, the virtualization layer at the destination virtualization system resumes the virtual machine based on the loaded data. The virtual machine on the destination virtualization system may pre-warm its memory cache by reading part of its cache while the data was being paged out from the source virtualization system and prior to achieving the move limit.

Continuous data protection support may also be achieved by running the move command operations 24×7 without the final suspend/resume. Periodic check points may be implemented to ensure consistency of the memory image. The periodic check points may occur coincident with the replica updates. At any point in time, the virtual machine may be resumed at the destination virtualization system based on the last coherent replica at the destination network storage unit. A customer may be presented with tunable parameters to control how frequently these check-points are performed, where the maximum setting requires all pages of memory to be written out constantly. The customer is then presented with a tradeoff of performance versus the time delay and potential for data loss as a result.

Cloning

When a user wishes to create a clone of a virtual machine, a virtual machine manager will trigger a snapshot as described above, and then request the snapshots to be unlinked. With the capabilities of a network storage system, a virtual machine can be cloned expeditiously.

Figure 18:
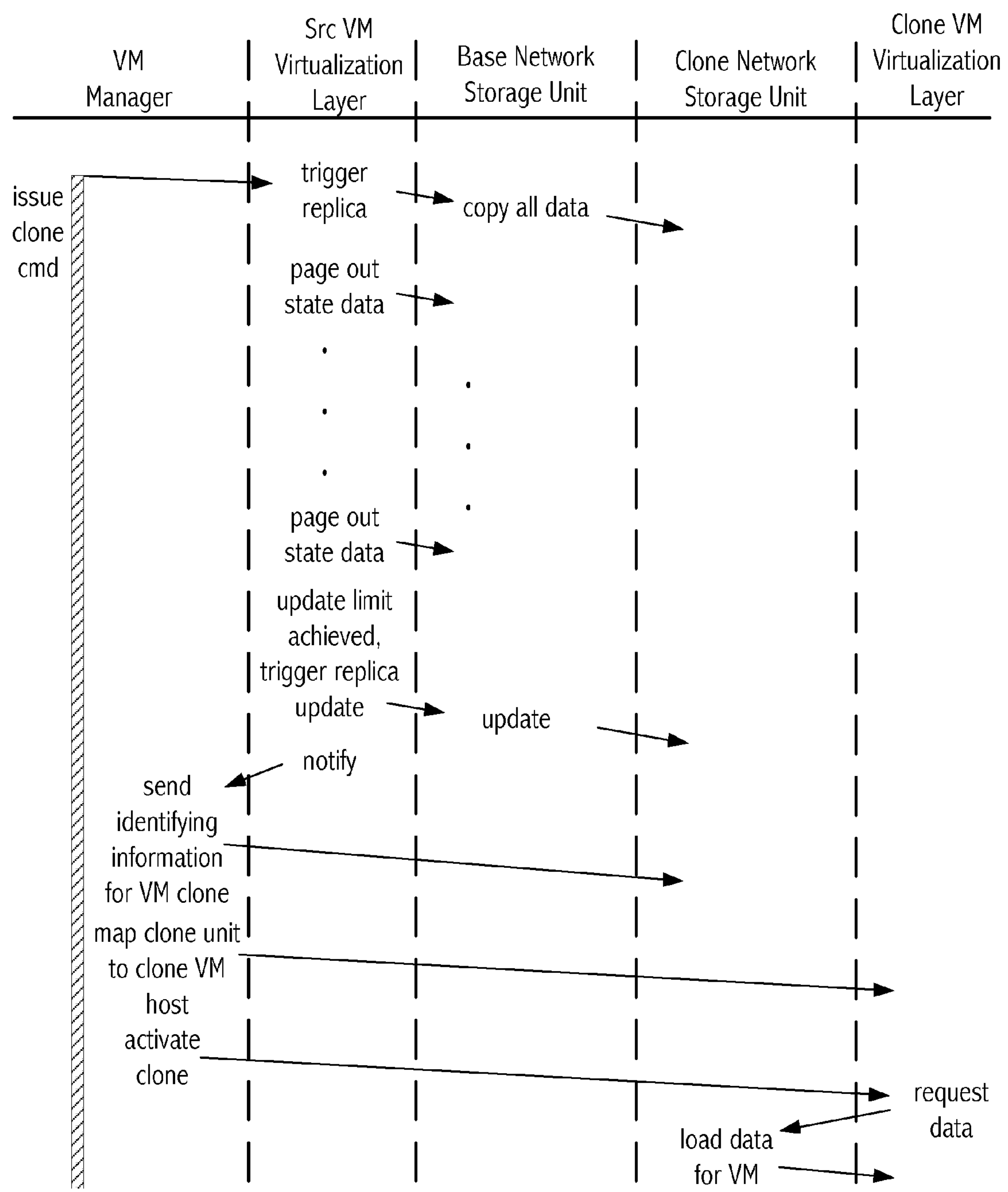
FIG. 18 depicts an embodiment of a clone command operation for a virtual machine.

FIG. 18 depicts an embodiment of a clone operation for a virtual machine. A virtual machine manager issues a clone command to a virtualization layer at a source virtualization system. The clone command causes the virtualization layer to trigger a replica of the data at a base network storage unit. Data for the virtual machine being cloned is copied from the base network storage unit to a clone network storage unit. The virtualization layer at the source virtualization system then begins paging out state data to the base network storage unit. This repeats until a limit is achieved. As stated above, the limit may be a percentage of data paged out, expiration of a time period, etc. Upon achieving the limit, an update replica is triggered. A replica of updates is made from the base network storage unit to the clone network storage unit. The virtualization layer of the source virtualization system then notifies the virtual machine manager that page out and replication is complete. Responsive to the notification, the virtual machine manager causes identifying information for the virtual machine clone to be written into the clone network storage unit. The data stored in the clone network storage unit is updated with the ID of the clone network storage unit, as well as unique identification information for the clone virtual machine. For example, the update information includes BIOS UUID, MAC address, etc. The virtual machine manager maps the clone network storage unit to the clone virtualization system. The virtual machine manager then causes the clone virtualization system to activate the clone virtual machine. The activation causes a virtualization layer at the clone virtualization system to request data for the clone virtual machine from the clone network storage unit. The clone virtual machine then begins operation based on the data loaded from the clone network storage unit.

Although the embodiment depicted in FIG. 18 illustrates paging out of state data, a clone command may replicate disk data as well. In one embodiment, the clone command forces the source virtual machine to be stopped or powered off, and then copies the disk data of the virtual machine. In another embodiment, the clone command causes the virtual machine to be temporarily disabled (e.g., triggers a quiesce operation). A quiesce operation may be employed to preserve consistency in the file system of the operating system guest of the disabled virtual machine. Moreover, these methods for effectuating a clone command may also be employed for effectuating a snapshot command.

Migrate

In addition to providing facilities for implementing current virtual machine management commands, implementation of virtual machines with network storage introduces additional management commands, such as migrate. In general, it may be necessary, or desirable, to move data (e.g., a virtual disk) of a virtual machine to a different storage pool using a migration facility.

Figure 19:
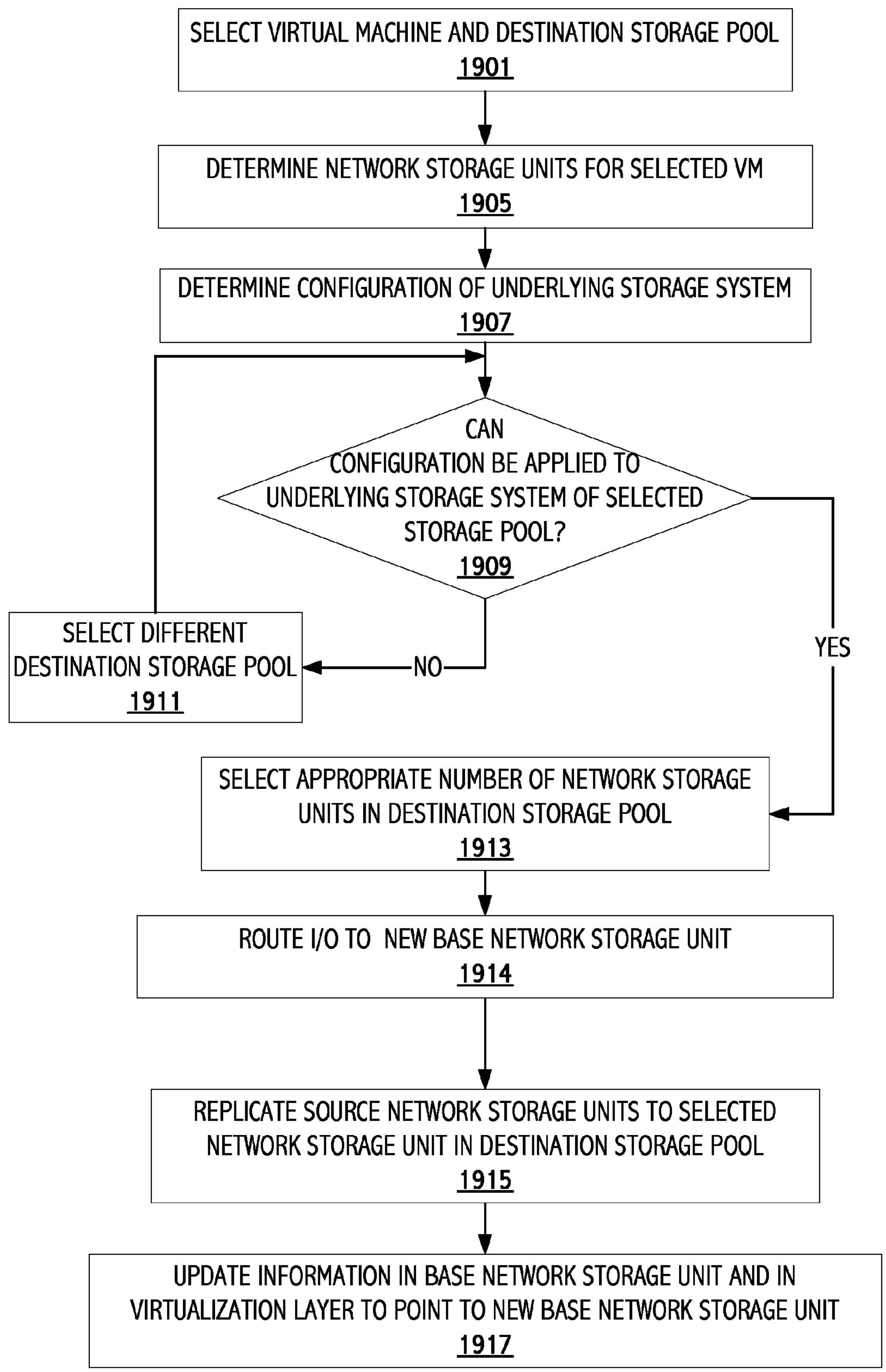
FIG. 19 depicts a flowchart of an embodiment of a method for migrating virtual machine data.

FIG. 19 depicts a flowchart of an embodiment of a method for migrating virtual machine data. At block 1901, a virtual machine and a destination storage pool are selected. At block 1905, corresponding network storage units for the selected virtual machine are determined. At block 1907, configuration settings of the underlying storage system for the current storage pool of the selected virtual machine are determined. At block 1909, it is determined if the configuration settings can be applied to the underlying storage system of the selected destination storage pool. At block 1911, a different destination storage pool is elected if it is determined that the configuration settings cannot be applied to the underlying storage system of the currently selected destination storage pool. Control flows from block 1911 back to block 1909. Otherwise, if the configuration settings can be applied, then the appropriate number of network storage units are selected from the destination storage pool at block 1913. If network storage units have not been created in the destination storage pool, then at least the proper number of network storage units are allocated from the destination storage pool to satisfy migration of the data for the selected virtual machine. At block 1914, I/O is routed to a new base network storage unit of the selected storage units in the destination storage pool. Pending I/O requests are flushed out. At block 1915, the network storage units for the virtual machine are replicated to the network storage units of the destination storage pool. At block 1917, information in the new base network storage unit for the virtual machine is updated to indicate the new corresponding network storage units in the destination storage pool. In addition, information in the virtualization layer for the selected virtual machine is updated to reference the network storage units in the destination storage pool. The old network storage units may now be dereferenced and deleted, returned to their storage pool, reassigned, etc.

The described embodiments may be provided as a computer program product, or software, that may include a machine-readable medium having stored thereon instructions, which may be used to program a computer system (or other electronic devices) to perform a process according to embodiments of the invention, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Other Embodiments

While the invention(s) is (are) described with reference to various implementations and exploitations, it will be understood that these embodiments are illustrative and that the scope of the invention(s) is not limited to them. In addition, while our description of virtualization techniques has generally assumed that the virtual machines present interfaces consistent with a hardware system, persons of ordinary skill in the art will recognize that the techniques described may be used in conjunction with virtualizations that do not correspond directly to any particular hardware system. Virtualization systems in accordance with the present invention, implemented as hosted embodiments, non-hosted embodiments or as embodiments that tend to blur distinctions between the two, are all envisioned. Furthermore, various operations may be wholly or partially implemented in hardware. For example, a hardware implementation may employ a look-up table for modification of storage access requests to secure non-disk data.

Many variations, modifications, additions, and improvements are possible, regardless the degree of virtualization. For example, while particular example operations were depicted for illustrative purposes, various techniques for exposing a network storage system and various operations for performing moves, migrations, clones, etc. of virtual machines will also be appreciated by persons of ordinary skill in the art. Furthermore, while techniques and mechanisms have been described using particular network configurations, hardware architectures, memory organizations and particular operating system constructs (typically IA-32 based architectures/systems and Windows operations systems) as a descriptive framework, persons of ordinary skill in the art will recognize other implementations can be envisioned for use in systems that support other processor instruction set architectures, other network or memory configurations and/or other operating system constructs.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A method comprising:

representing both virtual primary disk data and state data of a virtual machine in a unit of storage, wherein the virtual primary disk data comprises a virtual disk that is accessed by the virtual machine and the state data comprises execution state data of the virtual machine;

exposing the virtual primary disk data of the virtual machine to a guest of the virtual machine to allow the guest to access the virtual primary disk data;

intercepting a read access from the guest; and preventing the read access when the read access is for accessing the state data of the virtual machine.

2. The method of claim 1, wherein the preventing comprises:

partitioning the storage unit into at least a first partition for the virtual primary disk data and a second partition for at least the state data;

storing a partition table for the first partition into the second partition;

aligning the beginning of the virtual primary disk data with the beginning of the storage unit.

3. The method of claim 1, wherein the preventing comprises:

partitioning the storage unit into at least a first partition for the virtual primary disk data and a second partition for at least the state data;

writing a first partition table for the first and second partitions;

writing a second partition table for the first partition; and exposing the second partition table to the guest and preventing the guest access to the first partition table.

4. The method of claim 3, wherein the preventing access to the first partition table comprises modifying access requests from the guest with an offset that corresponds to location of the first partition table.

5. The method of claim 4 further comprising verifying that modified access requests fall within acceptable boundaries.

6. The method of claim 1, wherein the preventing comprises truncating size of the storage unit reported to the guest to hide the state data from the guest and storing the state data in a portion of the storage unit beyond the reported size.

7. The method of claim 1 further comprising:

representing other non-disk data in the storage unit; and preventing the guest from accessing the other non-disk data.

8. The method of claim 1, wherein the storage comprises at least one of removable storage, optical storage, disk drive, flash memory, network attached storage, and a storage in a storage area network.

9. A non-transitory computer-readable storage medium storing a virtualization system program, which, when executed by a processor, prepares a unit of storage to encode virtual primary disk data of a virtual machine accessible by a guest of the virtual machine, and to encode state data of the virtual machine, wherein the virtual primary disk data comprises a virtual disk that is accessed by the virtual machine and the state data comprises execution state data of the virtual machine, and wherein the virtualization system program is configured to intercept a read access from the guest and prevent the read access when the read access is for accessing the state data of the virtual machine.

10. The non-transitory computer-readable storage medium of claim 9, wherein the preparing comprises:

the virtualization system program partitioning the storage unit into at least a first partition for the virtual primary disk and a second partition for the state data, and writing a first partition table for the first and second partitions, and writing a second partition table for the first partition;

the virtualization system program communicating the partition tables and the partitions to a virtualization layer; and the virtualization system program indicating an offset to a virtualization layer, wherein the offset corresponds to location of the second partition table, wherein the virtualization layer interfaces between the virtual machine and a system hosting the virtual machine.

11. The non-transitory computer-readable storage medium of claim 9, wherein the preparing comprises:

the virtualization system program partitioning the storage unit into at least a first partition for the virtual primary disk and a second partition for the state data, and writing a first partition table for the first and second partitions, and writing a second partition table for the first partition; and the virtualization system program communicating the partition tables and the partitions to a virtualization layer, wherein access to the first partition table requires a sufficient privilege level, wherein the virtualization system program and the virtualization layer are at least assigned the sufficient privilege level, wherein the virtualization layer interfaces between the virtual machine and a system hosting the virtual machine.

12. The non-transitory computer-readable storage medium of claim 9, wherein the preparing comprises:

the virtualization system program partitioning the storage unit into at least a first partition for the virtual primary disk and a second partition for the state data, and writing a first partition table for the first and second partitions, and writing a second partition table for the first partition;

the virtualization system program storing a partition table for the first partition into the second partition and aligning the beginning of the virtual primary disk with the beginning of the storage unit.

13. The non-transitory computer-readable storage medium of claim 9, wherein the preparing comprises:

the virtualization system program partitioning the storage unit into at least a first partition for the virtual primary disk and a second partition for the state data, and writing a first partition table for the first and second partitions, and writing a second partition table for the first partition; and the virtualization system program encrypting the first partition table; and the virtualization system program communicating information to a virtualization layer to allow the virtualization layer to decrypt the first partition table, wherein the virtualization layer interfaces between the virtual machine and a system hosting the virtual machine.

14. The non-transitory computer-readable storage medium of claim 9, wherein the storage unit is prepared to prevent access by a guest to other non-disk data in addition to the state data.

15. The non-transitory computer-readable storage medium of claim 9, wherein the virtual machine is represented by the state data, the virtual primary disk, and virtual hardware configuration data that indicates at least a virtual processing unit.

16. The non-transitory computer-readable storage medium of claim 9, wherein the storage comprises one of a disk drive, removable storage, flash memory, optical storage, network attached storage, and storage in a storage area network.

17. A non-transitory computer-readable storage medium storing a program that implements a virtualization layer that interfaces between a computational system and a virtual machine hosted on the computational system and that examines all access requests from a guest of the virtual machine and, in response to said all access requests, to allow the guest to access virtual primary disk data of the virtual machine and to intercept read accesses from the guest and prevent the read accesses when the read accesses are for accessing the state data of the virtual machine, wherein the virtual primary disk data comprises a virtual disk that is accessed by the virtual machine and the state data comprises execution state data of the virtual machine.

18. The non-transitory computer-readable storage medium of claim 17, wherein the virtualization layer modifies size information of the storage unit to hide the state data from the guest, wherein the state data is stored in the storage unit at a location known to the virtualization layer.

19. The non-transitory computer-readable storage medium of claim 17, wherein the virtualization layer modifies location indications of write requests from the guest to ensure the guest does not modify state data of the virtual machine.

20. The non-transitory computer-readable storage medium of claim 19 further comprising the virtualization layer modifying location indications of responses to the write requests to maintain consistent presentation of the storage to the guests.

21. The non-transitory computer-readable storage medium of claim 19, further comprising the virtualization layer verifying that modified location indications of write requests from the guest are within permissible boundaries.

22. The non-transitory computer-readable storage medium of claim 19, wherein the location indications are modified with an offset that corresponds to location of a partition table for a partition of the storage unit that encodes the virtual primary disk data.

23. The non-transitory computer-readable storage medium of claim 17, wherein the virtualization layer interfaces between the raw physical hardware of the computational system and the virtual machine or between an operating system of the computational system and the virtual machine.

24. A non-transitory computer-readable storage medium storing a computer program comprising:

virtual machine provisioning code executable to, prepare a unit of storage to allow a guest of a virtual machine to access virtual disk data encoded in a first portion of the storage unit for the virtual machine, wherein the virtual disk data comprises a virtual disk that is accessed by the virtual machine, and prepare the storage unit to intercept a read access from the guest and prevent the read access when the read access is for accessing state data of the virtual machine, wherein the state data is encoded in a second portion of the storage unit and comprises execution state data of the virtual machine.

25. The non-transitory computer-readable storage medium of claim 24, wherein the virtual machine provisioning code is executable to encrypt the second portion to prevent the guest from accessing the state data.

26. The non-transitory computer-readable storage medium of claim 24, wherein the virtual machine provisioning code being executable to prepare the storage unit comprises:

the virtual machine provisioning code being executable to, partition the storage unit into at least a first partition for the virtual primary disk data and a second partition for the state data, write a first partition table for the first and second partitions, write a second partition table for the first partition and embed the second partition table in the second partition, and align the virtual primary disk data with the beginning of the storage unit.

27. The non-transitory computer-readable storage medium of claim 26, wherein the virtual machine provisioning code is further executable to partition the storage unit to include a third partition for virtual hardware configuration data that at least indicates a virtual processing unit for the virtual machine and executable to prevent the guest from accessing the third partition.

28. The non-transitory computer-readable storage medium of claim 26, wherein the virtual machine provisioning code being executable to prepare the storage unit comprises:

the virtual machine provisioning code being executable to, partition the storage unit into at least a first partition for the virtual primary disk data and a second partition for at least the state data, write a first partition table for the first and the second partitions, write a second partition table for the first partition, allow the guest access to the second partition table, and indicate an offset to a virtualization layer to prevent exposure of the first partition table to the guest, the offset corresponding to location of the second partition table in storage unit.

29. The non-transitory computer-readable storage medium of claim 28, wherein the virtual machine provisioning code is further executable to indicate, to a virtualization layer, boundary limits for access requests from a guest to prevent exposure of at least the state data to the guest.

30. A non-transitory computer-readable storage medium storing a computer program product comprising:

a first sequence of instructions executable to intercept access requests from a guest of a virtual machine destined for a unit of storage that encodes both primary virtual disk data and state data for the virtual machine, wherein the primary virtual disk data comprises a virtual disk that is accessed by the virtual machine and the state data comprises execution state data of the virtual machine; and a second sequence of instructions executable to, in accordance with access restrictions, intercept a read access from the guest and prevent the read access when the read access is for accessing the state data of the virtual machine.

31. The non-transitory computer-readable storage medium of claim 30, wherein the first sequence of instructions are further executable to intercept responses to the read access, wherein the second sequence of instructions are further executable to modify the intercepted response to maintain consistent presentation of the storage unit to the guest.

32. The non-transitory computer-readable storage medium of claim 30 further comprising a third sequence of instructions executable to make a call to a shared storage input/output application programming interface with the modified read access.

33. The non-transitory computer-readable storage medium of claim 30, wherein the second sequence of instructions are further executable to determine whether a modified read access indicates a valid location in the storage unit.

34. A system comprising:

a storage operable to encode both virtual primary disk data and state data of a virtual machine in a unit of the storage, wherein the virtual primary disk data comprises a virtual disk that is accessed by the virtual machine and the state data comprises execution state data of the virtual machine; and a virtual machine management system coupled with the storage, the virtual machine management system operable to prepare the storage unit to expose primary virtual disk data of the virtual machine to a guest and to intercept a read access from the guest and prevent the read access when the read access is for accessing the state data of the virtual machine.

35. The system of claim 34 further comprising a virtual machine host coupled with the storage, the virtual machine host operable to support the virtual machine, and operable to examine read accesses from a guest of the virtual machine to prevent the guest from accessing the virtual machine state data in the storage.

36. The system of claim 35 further comprising the virtual machine host modifying the read accesses to direct the read accesses to one or more locations in the storage unit that correspond to the virtual primary disk data.

37. The system of claim 35, wherein the examining comprises the virtual machine host determining whether a location indication of a read access falls within a permissible range of locations in the storage unit.

38. The system of claim 34, wherein the storage comprises at least one of a storage in a storage area network, network attached storage, a removable storage device, disk drive, and a flash memory.

* * * * *